US008011984B2

(12) United States Patent
Suzuki et al.

(10) Patent No.: US 8,011,984 B2

(45) Date of Patent: Sep. 6, 2011

(54) BOAT PROPULSION SYSTEM

(75) Inventors: Takayoshi Suzuki, Shizuoka (JP); Daisuke Nakamura, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 306 days.

(21) Appl. No.: 12/394,176

(22) Filed: Feb. 27, 2009

(65) Prior Publication Data

US 2009/0221194 A1 Sep. 3, 2009

(30) Foreign Application Priority Data

Feb. 28, 2008 (JP) ................................ 2008-048344

(51) Int. Cl.
*B60W 10/04* (2006.01)
*B63H 21/21* (2006.01)

(52) U.S. Cl. ........................................................ 440/86

(58) Field of Classification Search ................ 440/1, 84, 440/86, 87

See application file for complete search history.

(56) References Cited

U.S. PATENT DOCUMENTS 7,892,052 B2 * 2/2011 Suzuki et al. .................... 440/1
2003/0013354 A1 * 1/2003 Yanagihara ....................... 440/1
2006/0213301 A1 9/2006 Mizuguchi et al.

FOREIGN PATENT DOCUMENTS

JP 2006-264361 A 10/2006

* cited by examiner

*Primary Examiner* — Daniel Venne

(74) *Attorney, Agent, or Firm* — Keating & Bennett, LLP

(57) ABSTRACT

A boat propulsion system that easily and finely adjusts the rotational speed of a propeller includes an outboard motor including an engine, a propeller, a shift mechanism, and a control device. The control device controls engaging states of clutches so that the rotational speed of a second power transmission shaft is substantially the same as the rotational speed of a third power transmission shaft in a first mode in which the shift position is a forward or a reverse position. The control device controls the engaging states of the clutches so that the rotational speed of the third power transmission shaft is lower than the rotational speed of the second power transmission shaft in a second mode in which the shift position is the forward or the reverse position.

11 Claims, 20 Drawing Sheets

| Part name (numeral) | ○ : Clutch engaged | × :Clutch disengaged | | | |
|---|---|---|---|---|---|
| Hydraulic clutch for gear ratio change (53) | × | ○ | × (○) | × | ○ |
| First hydraulic clutch for shift change (61) | × | × | × | ○ | ○ |
| Second hydraulic clutch for shift change (62) | ○ | ○ | × | × | × |
| One-way clutch (58) | Reverse rotation inhibite | Forward rotation permitted | Non-operation | Reverse rotation inhibite | Forward rotation permitted |
| Shift position | Low speed forward | High speed forward | Neutral | Low speed reverse | High speed reverse |

FIG. 6

BOAT PROPULSION SYSTEM

BACKGROUND OF THE INVENTION

1. Field of the Invention

The present invention relates to a boat propulsion system.

2. Description of the Related Art

As described in JP-A-2006-264361, for example, a conventional device to change the shift position by driving a shift mechanism of an outboard motor with an electric actuator is proposed. In the shift mechanism shown in JP-A-2006-264361, a shift change is made between a forward, a reverse, and a neutral position by engaging or disengaging a dog clutch with an electric actuator.

In the outboard motor disclosed in JP-A-2006-264361, it is difficult to finely adjust the rotational speed of a propeller. This makes it difficult to finely adjust a boat sailing speed. Especially, for example, it is difficult to finely adjust the boat speed sailing in a low speed range or in a very low speed range during an operation of leaving from or approaching to a dock or quay, or during trolling.

SUMMARY OF THE INVENTION

In order to overcome the problems described above, preferred embodiments of the present invention provide a boat propulsion system that can easily perform fine adjustment of a rotational speed of a propeller.

A first boat propulsion system according to a preferred embodiment of the present invention includes a power source, a propeller, a shift position change mechanism, and a control device. The power source generates a turning force. The propeller is rotated by the turning force of the power source. The shift position change mechanism changes the shift position between a forward position, a reverse position and a neutral position in which a clutch is disengaged. The shift position change mechanism includes an input shaft, an output shaft, and the clutch. The turning force is input from the power source to the input shaft. The output shaft outputs the turning force to a propeller side. The clutch engages or disengages between the input shaft and the output shaft. The control device controls the shift position change mechanism. The control device controls an engaging state of the clutch so that the rotational speed of the output shaft is substantially the same as the rotational speed of the input shaft in a first mode in which the shift position is the forward, the reverse, or the neutral position. The control device controls the engaging state of the clutch so that the rotational speed of the output shaft is lower than the rotational speed of the input shaft in a second mode in which the shift position is the forward, the reverse, or the neutral position.

A second boat propulsion system according to another preferred embodiment of the present invention includes a power source, a propeller, a shift position change mechanism, and a control device. The power source generates a turning force. The propeller is rotated by the turning force of the power source. The shift position change mechanism changes the shift position between a forward position, a reverse position and a neutral position in which a clutch is disengaged. The shift position change mechanism includes an input shaft, an output shaft, and the clutch. The turning force is input from the power source to the input shaft. The output shaft outputs the turning force to a propeller side. The clutch changes an engaging state between the input shaft and the output shaft. The control device controls the shift position change mechanism. The control device controls an engaging state of the clutch so that the rotational speed of the output shaft is substantially the same as the rotational speed of the input shaft in a first mode in which the shift position is the forward or the reverse position. The control device controls the engaging state of the clutch so that the rotational speed of the output shaft is lower than the rotational speed of the input shaft in a second mode in which the shift position is the forward or the reverse position.

According to various preferred embodiments of the present invention, it is possible to realize a boat propulsion system that can easily and accurately perform fine adjustment of the rotational speed of a propeller.

Other features, elements, steps, characteristics and advantages of the present invention will become more apparent from the following detailed description of preferred embodiments of the present invention with reference to the attached drawings.

BRIEF DESCRIPTION OF THE DRAWINGS

FIG. 6 is a table showing engaging states of first to third hydraulic clutches and the shift position of the shift mechanism.

DETAILED DESCRIPTION OF THE PREFERRED EMBODIMENTS

Example of preferred embodiments of the present invention will hereinafter be described by using an outboard motor 20 shown in FIG. 1 as a boat propulsion system. The following preferred embodiments are mere examples of the preferred embodiments carrying out the present invention. The present invention is not limited to the following preferred embodiments.

A boat propulsion system according to a preferred embodiment of the present invention may be a so-called inboard motor or a so-called stern drive for example. The stern drive is also referred to as an inboard-outboard. The "stern drive" is a boat propulsion system in which at least a power source is installed on a hull. The "stern drive" also includes a system in which other components than a propulsion section are installed on a hull.

First Preferred Embodiment

Figure 1:
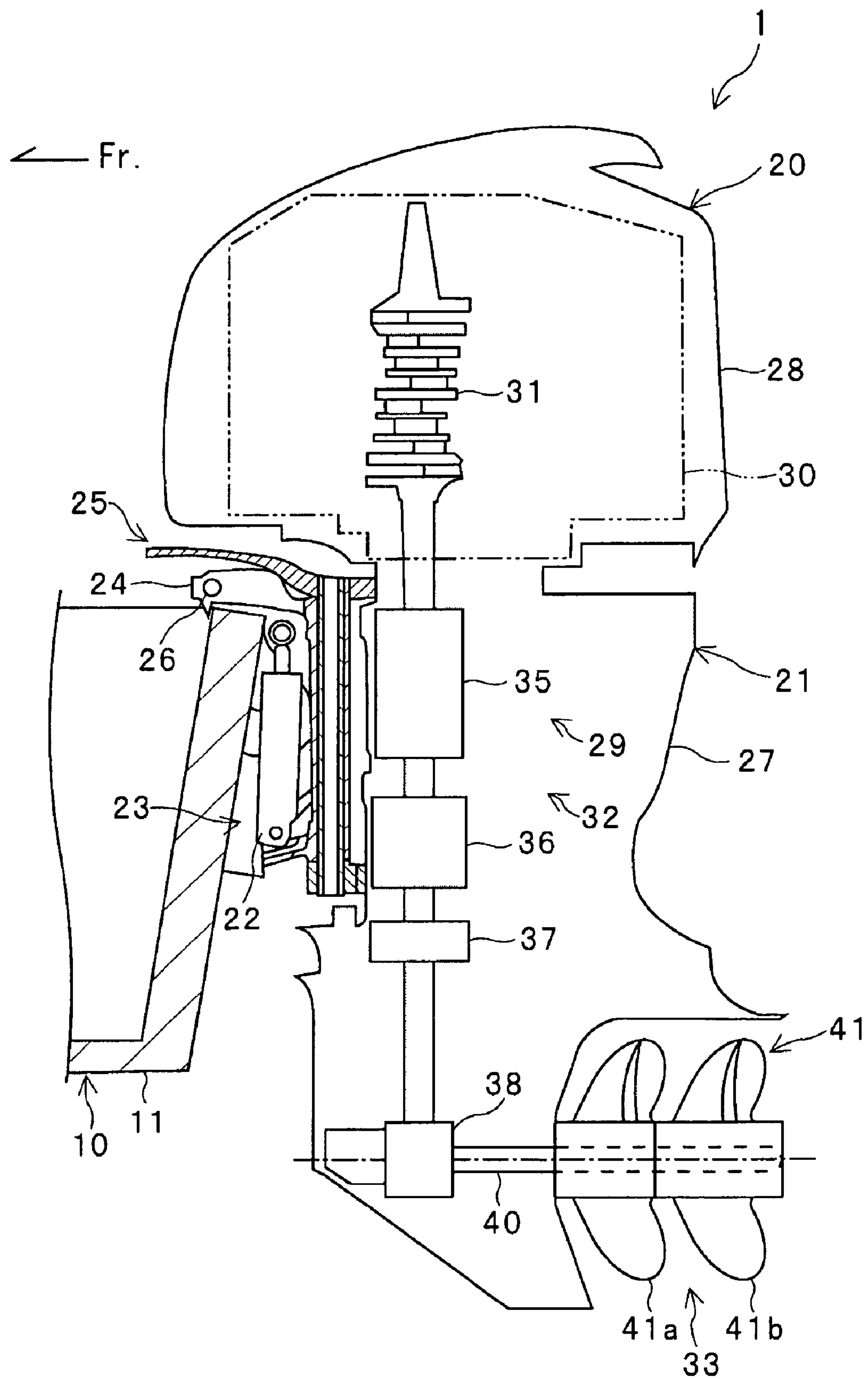
FIG. 1 is a partial cross sectional view of the stern portion of a boat in accordance with a first preferred embodiment of the present invention as viewed from a side.

FIG. 1 is a schematic partial cross-sectional view of a stern 11 of a boat 1 according to a first preferred embodiment, in a side view. As shown in FIG. 1, the boat 1 includes a hull 10 and an outboard motor 20. The outboard motor 20 is attached to the stern 11 of the hull 10.

General Structure of Outboard Motor 20

The outboard motor 20 includes an outboard motor body 21, a tilt and trim mechanism 22, and a bracket 23.

The bracket 23 includes a mount bracket 24 and a swivel bracket 25. The mount bracket 24 is fixed to the hull 10. The swivel bracket 25 is swingable about a turning shaft 26 with respect to the mount bracket 24.

The tilt and trim mechanism 22 performs a tilt operation and a trim operation of the outboard motor body 21. Specifically, the tilt and trim mechanism 22 swings the swivel bracket 25 about the mount bracket 24.

The outboard motor body 21 includes a casing 27, a cowling 28, and a thrust generating unit 29. The thrust generating unit 29 is housed in the casing 27 and the cowling 28 except for a portion of a propulsion section 33 which will be described later.

Figure 2:
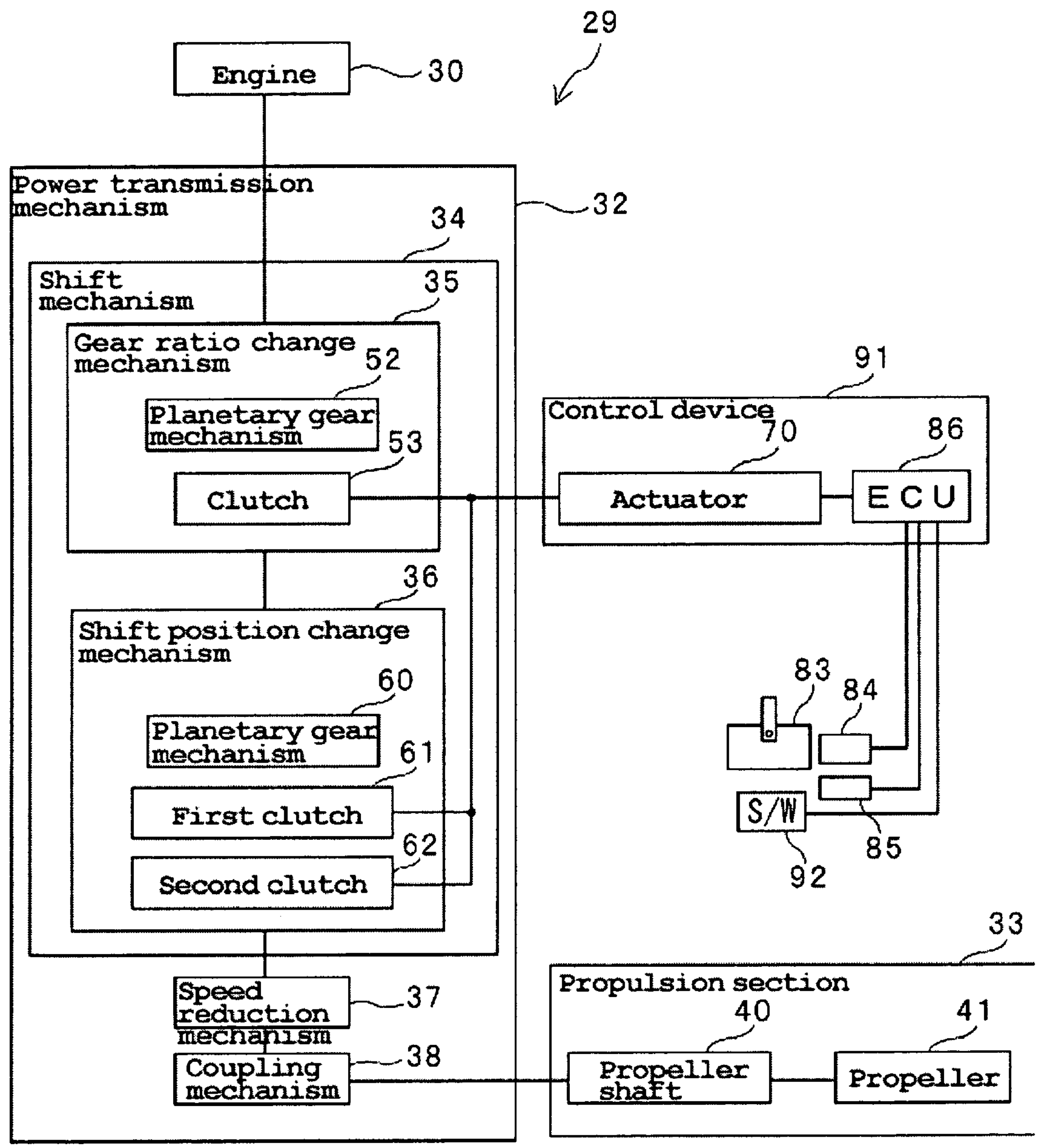
FIG. 2 is a schematic configuration diagram showing the configuration of a thrust generating unit in accordance with the first preferred embodiment of the present invention.

As shown in FIGS. 1 and 2, the thrust generating unit 29 includes an engine 30, a power transmission mechanism 32, and the propulsion section 33.

In this preferred embodiment, an example in which the outboard motor 20 has the engine 30 as a power source is described. However, the power source is not specifically limited as long as it can generate a turning force. For example, the power source may be an electric motor.

Figure 5:
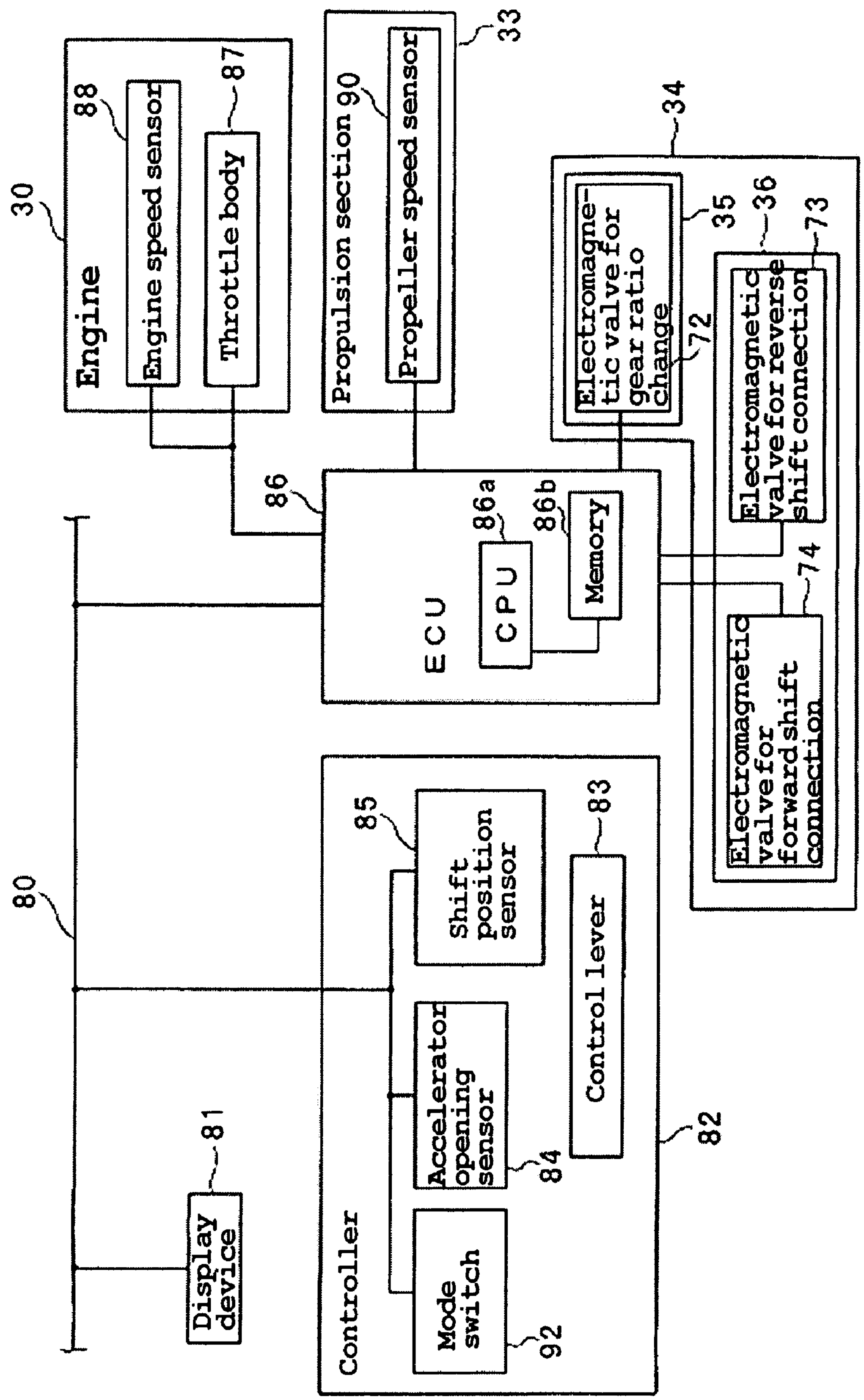
FIG. 5 is a control block diagram of the boat.

The engine 30 preferably is a fuel injection engine having a throttle body 87 shown in FIG. 5. In the engine 30, the engine speed and the engine power are adjusted by adjusting the throttle opening. The engine 30 generates a turning force. As shown in FIG. 1, the engine 30 includes a crankshaft 31. The engine 30 outputs the generated turning force via the crankshaft 31.

The power transmission mechanism 32 is arranged between the engine 30 and the propulsion section 33. The power transmission mechanism 32 transmits the turning force generated by the engine 30 to the propulsion section 33. The transmission mechanism 32 includes a shift mechanism 34, a speed reduction mechanism 37, and a coupling mechanism 38.

The shift mechanism 34 is connected to the crankshaft 31 of the engine 30. As shown in FIG. 2, the shift mechanism 34 includes a gear ratio change mechanism 35 and a shift position change mechanism 36.

The gear ratio change mechanism 35 changes the gear ratio between the engine 30 and the propulsion section 33 between a high speed gear ratio (HIGH) and a low speed gear ratio (LOW). Here, the "high speed gear ratio" is a gear ratio in which the ratio of the output side rotational speed to the input side rotational speed is relatively high. In contrast, the "low speed gear ratio" is a gear ratio in which the ratio of the output side rotational speed to the input side rotational speed is relatively low.

The shift position change mechanism 36 changes the shift position between a forward position a reverse position and a neutral position.

The speed reduction mechanism 37 is arranged between the shift mechanism 34 and the propulsion section 33. The speed reduction mechanism 37 transmits the turning force from the shift mechanism 34 to the propulsion section 33 while reducing the rotational speed. Here, the structure of the speed reduction mechanism 37 is not particularly limited. For example, the speed reduction mechanism 37 may have a planetary gear mechanism. Further, the speed reduction mechanism 37 may have, for example, a speed reduction gear-set.

The coupling mechanism 38 is arranged between the speed reduction mechanism 37 and the propulsion section 33. The coupling mechanism 38 includes a bevel gear-set (not shown). The coupling mechanism 38 transmits the turning force from the speed reduction mechanism 37 to the propulsion section 33 while changing the direction.

The propulsion section 33 includes a propeller shaft 40 and a propeller 41. The propeller shaft 40 transmits the turning force from the coupling mechanism 38 to the propeller 41. The propulsion section mechanism 33 converts the turning force generated by the engine 30 into thrust.

As shown in FIG. 1, the propeller 41 preferably includes two propellers, a first propeller 41*a* and a second propeller 41*b*. The rotation direction of the first propeller 41*a* is opposite to that of the second propeller 41*b*. When the turning force output from the power transmission mechanism 32 is in a forward direction, the first propeller 41*a* and the second propeller 41*b* rotate in the directions opposite with respect to each other, thereby generating thrust in a forward direction. Thus, the shift position is made forward. On the other hand, when the turning force output from the power transmission mechanism 32 is in a reverse direction, the first propeller 41*a* and the second propeller 41*b* respectively rotate in a direction opposite to that during forward movement. As a result, the thrust in the reverse direction is generated. Accordingly, the shift position is made reverse.

In this regard, the propeller 41 may include a single propeller or three or more propellers.

Detailed Structure of Shift Mechanism 34

Figure 3:
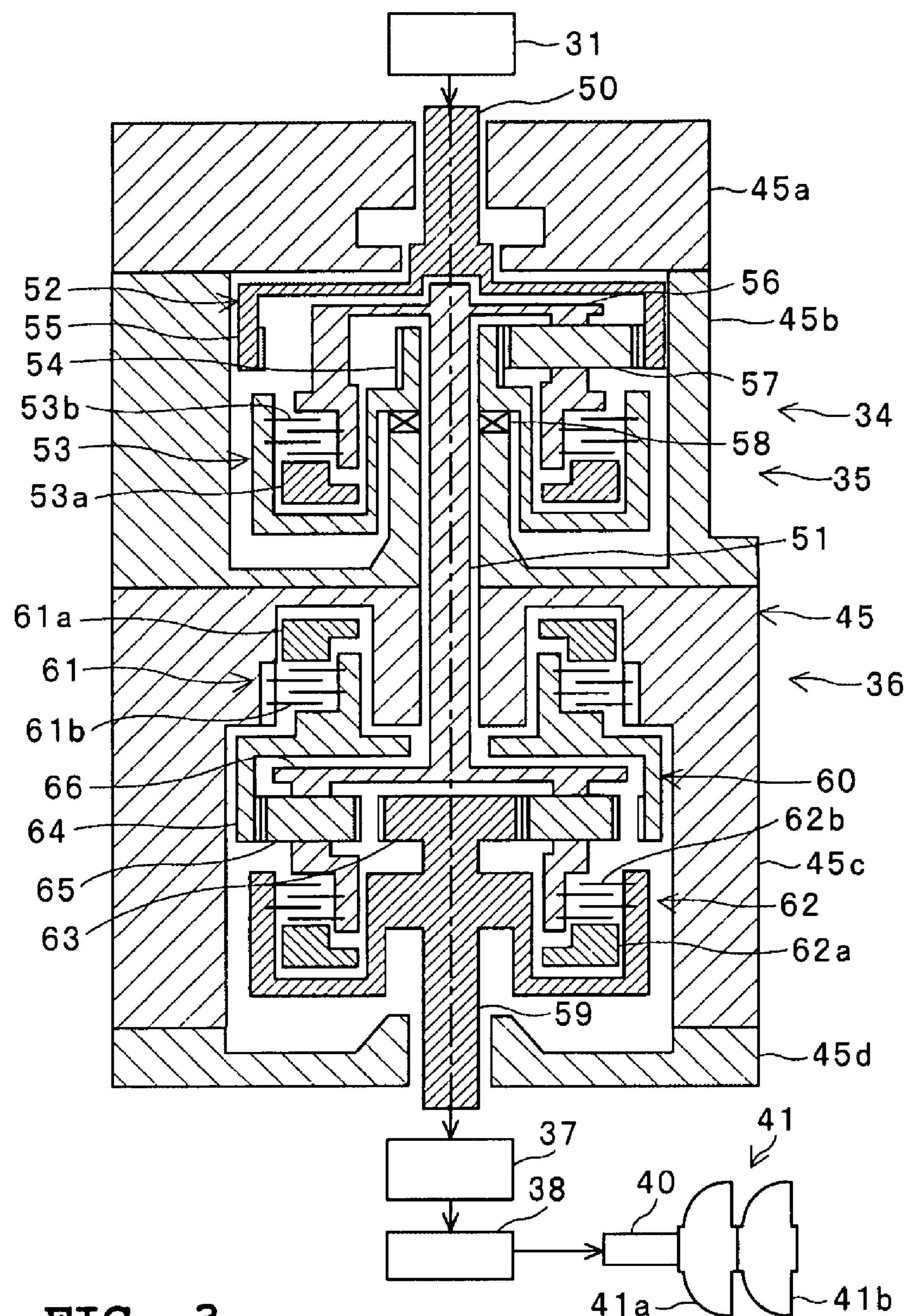
FIG. 3 is a schematic cross sectional view of a shift mechanism in accordance with the first preferred embodiment of the present invention.

Next, referring mainly to FIG. 3, the structure of the shift mechanism 34 in this preferred embodiment will be described in detail. FIG. 3 shows a schematic structure of the shift mechanism 34. Accordingly, the actual structure of the shift mechanism 34 is not precisely the same as that in FIG. 3.

The shift mechanism 34 includes a shift case 45. The shift case 45 is generally cylindrical in appearance. The shift case 45 includes a first case 45*a*, a second case 45*b*, a third case 45*c*, and a fourth case 45*d*. The first case 45*a*, the second case 45*b*, the third case 45*c*, and the fourth case 45*d* are integrally fixed preferably by bolts or other fastening or connecting elements.

Gear Ratio Change Mechanism 35

The gear ratio change mechanism 35 includes a first power transmission shaft 50 as an input shaft, a second power transmission shaft 51 as an output shaft, a planetary gear mechanism 52 as a shift gear-set, and a hydraulic clutch 53 for gear ratio change.

The planetary gear mechanism 52 transmits rotation of the first power transmission shaft 50 to the second power transmission shaft 51 at a low speed gear ratio (LOW) or a high speed gear ratio (HIGH). The gear ratio of the planetary gear mechanism 52 is changed by engaging or disengaging the hydraulic clutch 53 for gear ratio change.

The first power transmission shaft 50 and the second power transmission shaft 51 are arranged coaxially. The first power transmission shaft 50 is rotatably supported by the first case 45*a*. The second power transmission shaft 51 is rotatably supported by the second case 45*b* and the third case 45*c*. The first power transmission shaft 50 is connected to the crankshaft 31. The first power transmission shaft 50 is also connected to the planetary gear mechanism 52.

The planetary gear mechanism 52 includes a sun gear 54, a ring gear 55, a carrier 56, and a plurality of planetary gears 57. The ring gear 55 is formed generally cylindrical. On an inner periphery surface of the ring gear 55, teeth are formed to mesh with the planetary gear 57. The ring gear 55 is connected to the first power transmission shaft 50. The ring gear 55 rotates together with the first power transmission shaft 50.

The sun gear 54 is arranged within the ring gear 55. The sun gear 54 rotates coaxially with the ring gear 55. The sun gear 54 is attached to the second case 45*b* via a one-way clutch 58. The one-way clutch 58 permits rotation in a forward direction while restrains rotation in a reverse direction. Therefore, the sun gear 54 can rotate forward while it cannot rotate reversely.

A plurality of the planetary gears 57 are arranged between the sun gear 54 and the ring gear 55. Each planetary gear 57 meshes with both the sun gear 54 and the ring gear 55. Each planetary gear 57 is rotatably supported by the carrier 56. As a result, each of a plurality of the planetary gears 57 revolves around an axis of the first power transmission shaft 50 at the mutually same speed while rotating itself.

In this specification, "rotation" means that a member turns around an axis positioned within the member. In contrast, "revolution" means that a member turns around an axis positioned outside the member.

The carrier 56 is connected to the second power transmission shaft 51. The carrier 56 rotates together with the second power transmission shaft 51.

The hydraulic clutch 53 for gear ratio change is arranged between the carrier 56 and the sun gear 54. In this preferred embodiment, the hydraulic clutch 53 for gear ratio change preferably is a wet type multi-plate clutch. However, in the present invention, the hydraulic clutch 53 for gear ratio change is not limited to a wet type multi-plate clutch. The hydraulic clutch 53 for gear ratio change may be a dry type multi-plate clutch or a so-called dog clutch, for example.

In this specification, the "multi-plate clutch" preferably is a clutch that includes a first member and a second member capable of rotating mutually with each other, one or plural first plates rotating together with the first member, and one or plural second plates rotating together with the second member, in which rotation between the first member and the second member is controlled by the pressurized contact between the first plates and the second plates. In this specification, "clutch" is not limited to an article that is arranged between an input shaft to which the turning force is input and an output shaft from which the turning force is output to connect or disconnect therebetween.

The hydraulic clutch 53 for gear ratio change includes a hydraulic piston 53*a* and a plate group 53*b* including clutch plates and friction plates. When the piston 53*a* is driven, the plate group 53*b* comes into pressurized contact. As a result, the hydraulic clutch 53 for gear ratio change is engaged. In contrast, when the piston 53*a* is not driven, the plate group 53*b* comes into non-pressurized contact. As a result, the hydraulic clutch 53 for gear ratio change is disengaged.

When the hydraulic clutch 53 for gear ratio change is engaged, the sun gear 54 and the carrier 56 become fixed each other. Accordingly, the sun gear 54 and the carrier 56 integrally rotate as the planetary gears 57 revolve.

Shift Position Change Mechanism 36

The shift position change mechanism 36 changes the shift position between a forward position, a reverse position and a neutral position. The shift position change mechanism 36 includes the second power transmission shaft 51 as an input shaft, a third power transmission shaft 59 as an output shaft, a planetary gear mechanism 60 as a rotational direction change mechanism, a first hydraulic clutch 61 for shift change, and a second hydraulic clutch 62 for shift change.

The first hydraulic clutch 61 for shift change and the second hydraulic clutch 62 for shift change connect or disconnect the second power transmission shaft 51 as an input shaft to or from the third power transmission shaft 59 as an output shaft. Specifically, connection between the second power transmission shaft 51 and the third power transmission shaft 59 changes by connecting or disconnecting the first hydraulic clutch 61 to or from the second hydraulic clutch 62. In other words, the first hydraulic clutch 61 and the second hydraulic clutch 62 are devices for changing connection between the second power transmission shaft 51 and the third power transmission shaft 59. Specifically, the rotational speed of the third power transmission shaft 59 with respect to the rotational speed of the second power transmission shaft 51 is adjusted by adjusting a connecting force between the first hydraulic clutch 61 and the second hydraulic clutch 62. More specifically, the rotational direction of the third power transmission shaft 59 with respect to the rotational direction of the second power transmission shaft 51 and the ratio of the absolute value of the rotational speed of the third power transmission shaft 59 to the absolute value of the rotational speed of the second power transmission shaft 51 are adjusted by adjusting the connecting forces of the first hydraulic clutch 61 and the second hydraulic clutch 62.

The planetary gear mechanism 52 changes the rotational direction of the third power transmission shaft 59 with respect to the rotational direction of the second power transmission shaft 51. Specifically, the planetary gear mechanism 52 transmits the turning force of the second power transmission shaft 51 as a turning force in a forward direction or a reverse direction to the third power transmission shaft 59. The rotational direction of the turning force transmitted by the planetary gear mechanism 52 is changed by engaging or disengaging the first hydraulic clutch 61 and the second hydraulic clutch 62.

The third power transmission shaft 59 is rotatably supported by the third case 45*c* and the fourth case 45*d*. The second power transmission shaft 51 and the third power transmission shaft 59 are arranged coaxially. In this preferred embodiment, the hydraulic clutches 61, 62 preferably are a wet type multiple-plate clutch. However, the hydraulic clutches 61, 62 may be a dog clutch, respectively, for example.

Here, the second power transmission shaft 51 is a common member to the gear ratio change mechanism 35 and the shift position change mechanism 36.

The planetary gear mechanism 60 includes a sun gear 63, a ring gear 64, a plurality of planetary gears 65, and a carrier 66.

The carrier 66 is connected to the second power transmission shaft 51. The carrier 66 rotates together with the second power transmission shaft 51. Accordingly, as the second power transmission shaft 51 rotates, the carrier 66 rotates and a plurality of the planetary gears 65 mutually revolve at the same speed with each other.

A plurality of the planetary gears 65 mesh with the ring gear 64 and the sun gear 63. The first hydraulic clutch 61 is arranged between the ring gear 64 and the third case 45*c*. The first hydraulic clutch 61 includes a hydraulic piston 61*a* and a plate group 61*b* including clutch plates and friction plates. When the hydraulic piston 61*a* is driven, the plate group 61*b* comes into pressurized contact. This causes the first hydraulic clutch 61 to be engaged. As a result, the ring gear 64 is fixed to the third case 45*c* and disabled so as not to rotate. In contrast, when the piston 61*a* is not driven, the plate group 61*b* comes into non-pressurized contact. This causes the first hydraulic clutch 61 to be disengaged. As a result, the ring gear 64 is unfixed to the third case 45*c* and enabled to rotate.

The second hydraulic clutch 62 is arranged between the carrier 66 and the sun gear 63. The second hydraulic clutch 62 includes a hydraulic piston 62*a* and a plate group 62*b* including clutch plates and friction plates. When the piston 62*a* is driven, the plate group 62*b* comes into pressurized contact. This causes the second hydraulic clutch 62 to be engaged. As a result, the carrier 66 and the sun gear 63 integrally rotate. In contrast, when the piston 62*a* is not driven, the plate group 62*b* comes into non-pressurized contact. This causes the second hydraulic clutch 62 to be disengaged. As a result, the ring gear 64 and the sun gear 63 are enabled to rotate separately.

Here, the reduction ratio of the planetary gear mechanism 60 is not limited to 1:1. The planetary gear mechanism 60 may have a reduction ratio other than 1:1. The reduction ratios may either be same or different between the case in which the planetary gear mechanism 60 transmits the turning force in the forward direction and the case in which the planetary gear mechanism 60 transmits the turning force in the reverse direction.

In this preferred embodiment, the description will be made of the case in which the planetary gear mechanism 60 has a reduction ratio other than 1:1 and the reduction ratios are different between the case in which the planetary gear mechanism 60 transmits the turning force in the forward direction and the case in which the planetary gear mechanism 60 transmits the turning force in the reverse direction.

Specifically, in this preferred embodiment, examples of approximate values of the ratio between the rotational speed of the first power transmission shaft 50 and the rotational speed of the third power transmission shaft 59 preferably is as follows.

High speed forward: 1:1, with a reduction ratio of 1
High speed reverse: 1:1.08, with a reduction ratio of 0.93
Low speed forward: 1:0.77, with a reduction ratio of 1.3
Low speed reverse: 1:0.83, with a reduction ratio of 1.21

As shown in FIG. 2, the shift mechanism 34 is controlled by the control device 91. Specifically, the hydraulic clutch 53 for gear ratio change, the first hydraulic clutch 61, and the second hydraulic clutch 62 are controlled by the control device 91.

The control device 91 includes an actuator 70 and an electronic control unit (ECU) 86 as an electronic control unit. The actuator 70 engages and disengages the hydraulic clutch 53 for gear ratio change, the first hydraulic clutch 61, and the second hydraulic clutch 62. The ECU 86 controls the actuator 70.

Figure 4:
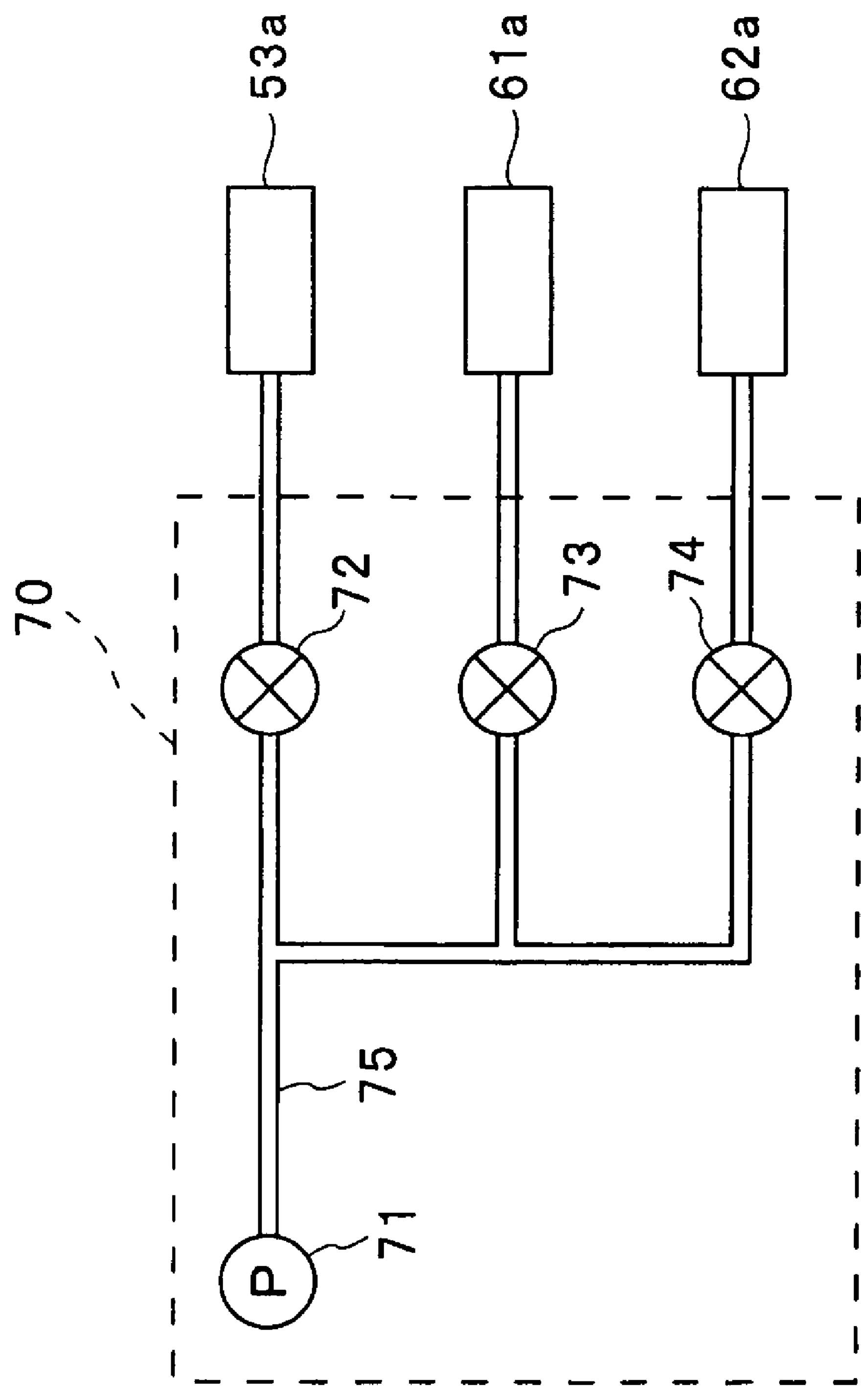
FIG. 4 is an oil circuit diagram in accordance with the first preferred embodiment of the present invention.

Specifically, as shown in FIG. 4, hydraulic cylinders 53*a*, 61*a*, 62*a* are driven by the actuator 70. The actuator 70 includes an oil pump 71, an oil passage 75, an electromagnetic valve 72 for gear ratio change, an electromagnetic valve 73 for reverse shift connection, and an electromagnetic valve 74 for forward shift connection.

The oil pump 71 is connected to the hydraulic cylinders 53*a*, 61*a*, 62*a* with the oil passage 75. The electromagnetic valve 72 for gear ratio change is arranged between the oil pump 71 and the hydraulic cylinder 53*a*. Hydraulic pressure of the hydraulic cylinder 53*a* is adjusted by the electromagnetic valve 72 for gear ratio change. The electromagnetic valve 73 for reverse shift connection is arranged between the oil pump 71 and the hydraulic cylinder 61*a*. Hydraulic pressure of the hydraulic cylinder 61*a* is adjusted by the electromagnetic valve 73 for reverse shift connection. The electromagnetic valve 74 for forward shift connection is arranged between the oil pump 71 and the hydraulic cylinder 62*a*. Hydraulic pressure of the hydraulic cylinder 62*a* is adjusted by the electromagnetic valve 74 for forward shift connection.

Figure 7:
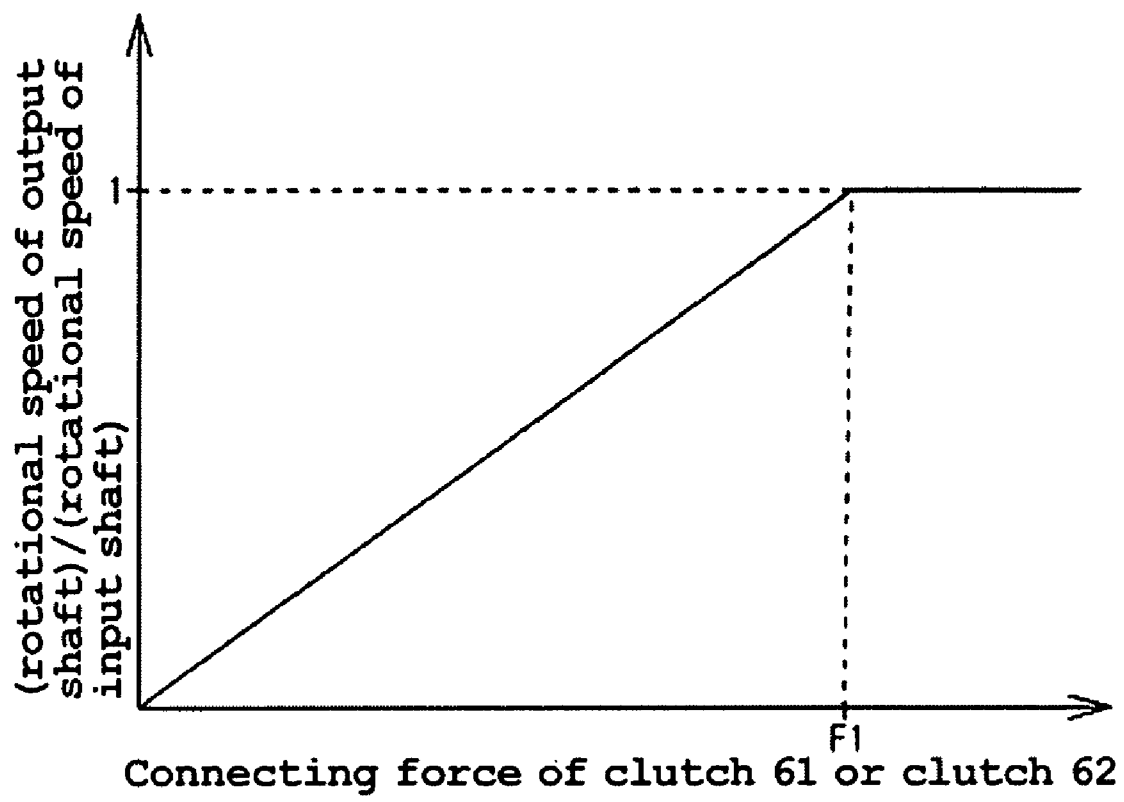
FIG. 7 is a graph showing the relationship between a connecting force of the hydraulic clutch for shift change and a ratio of the rotational speed of an output shaft to the rotational speed of an input shaft.

Each of the electromagnetic valve 72 for gear ratio change, the electromagnetic valve 73 for reverse shift connection, and the electromagnetic valve 74 for forward shift connection is capable of gradually changing the cross-section area of the oil passage 75. Accordingly, pressing forces of the cylinders 53*a*, 61*a*, 63*a* can be gradually changed by using the electromagnetic valve 72 for gear ratio change, the electromagnetic valve 73 for reverse shift connection, and the electromagnetic valve 74 for forward shift connection. This enables the hydraulic clutches 53, 61, 62 to gradually change their connecting forces. Therefore, as shown in FIG. 7, the ratio of the rotational speed of the third power transmission shaft 59 to that of the second power transmission shaft 51 can be adjusted. As a result, the ratio of the rotational speed of the third power transmission shaft 59 as an output shaft to the rotational speed of the second power transmission shaft 51 as an input shaft can be substantially adjusted in a continuous manner.

In this preferred embodiment, each of the electromagnetic valve 72 for gear ratio change, the electromagnetic valve 73 for reverse shift connection, and the electromagnetic valve 74 for forward shift connection is preferably configured by a PWM (Pulse Width Modulation) controlled solenoid. However, each of the electromagnetic valve 72 for gear ratio change, the electromagnetic valve 73 for reverse shift connection, and the electromagnetic valve 74 for forward shift connection may be configured by a valve other than a PWM controlled solenoid valve. For example, each of the electromagnetic valve 72 for gear ratio change, the electromagnetic valve 73 for reverse shift connection, and the electromagnetic valve 74 for forward shift connection may be configured by an on/off controlled solenoid valve.

Shift Operation of Shift Mechanism 34

Next, the description will be made of a shift operation of the shift mechanism 34 in details mainly with reference to FIGS. 3 and 6. FIG. 6 is a table showing engaging states of the hydraulic clutches 53, 61, 62 and the shift position of the shift mechanism 34. In the shift mechanism 34, the shift position is changed by engaging or disengaging of the first to third hydraulic clutches 53, 61, 62.

Shift Change Between Low Speed Gear Ratio and High Speed Gear Ratio

The shift change between the low speed gear ratio and the high speed gear ratio is made by the gear ratio change mechanism 35. Specifically, the shift change between the low speed gear ratio and the high speed gear ratio is made by an operation of the hydraulic clutch 53 for gear ratio change. More specifically, when the hydraulic clutch 53 for gear ratio change is disengaged, the gear ratio of the gear ratio change mechanism 35 becomes "low speed gear ratio." In contrast, when the hydraulic clutch 53 for gear ratio change is engaged, the gear ratio of the gear ratio change mechanism 35 becomes "high speed gear ratio."

As shown in FIG. 3, the ring gear 55 is connected to the first power transmission shaft 50. Accordingly, the ring gear 55 rotates in the forward direction as the first power transmission shaft 50 rotates. Here, when the hydraulic clutch 53 for gear ratio change is disengaged, the carrier 56 and the sun gear 54 mutually become rotatable. Accordingly, the planetary gears 57 revolve while rotating. As a result, the sun gear 54 attempts to rotate in the reverse direction.

However, as shown in FIG. 6, the one-way clutch 58 prevents rotation of the sun gear 54 in the reverse direction. Therefore, the sun gear 54 is fixed by the one-way clutch 58. As a result, as the ring gear 55 rotates, the planetary gears 57 revolve between the sun gear 54 and the ring gear 55, which causes the second power transmission shaft 51 to rotate together with the carrier 56. In this case, since the planetary gears 57 rotate while revolving, the rotation of the first power transmission shaft 50 is decelerated and transmitted to the second power transmission shaft 51. The gear ratio of the gear ratio change mechanism 35 is thus changed to the "low speed gear ratio."

On the other hand, when the hydraulic clutch 53 for gear ratio change is engaged, the planetary gears 57 and the sun gear 54 rotate integrally with each other. Accordingly, rotation of the planetary gears 57 is prohibited. Thus, as the ring gear 55 rotates, the planetary gears 57, the carrier 56, and the sun gear 54 rotate in the forward direction at the same rotational speed as that of the ring gear 55. Here, as shown in FIG. 6, the one-way clutch 58 permits rotation of the sun gear 54 in the forward direction. As a result, the first power transmission shaft 50 and the second power transmission shaft 51 rotate in the forward direction at a substantially same rotational speed. In other words, the turning force of the first power transmission shaft 50 is transmitted to the second power transmission shaft 51 at the same rotational speed and in the same rotational direction. The gear ratio of the gear ratio change mechanism 35 is thus changed to the "high speed gear ratio."

Changing between forward, reverse and neutral positions

A shift change is made between a forward or a reverse position and a neutral position in the shift position change mechanism 36. Specifically, the first hydraulic clutch 61 and the second hydraulic clutch 62 are operated to change the shift position between a forward position, a reverse position and a neutral position.

When the first hydraulic clutch 61 is disengaged while the second hydraulic clutch 62 is engaged, the shift position of the shift position change mechanism 36 is made "forward." When the first hydraulic clutch 61 is disengaged, the ring gear 64 is rotatable relative to the shift case 45. When the second hydraulic clutch 62 is engaged, the carrier 66, the sun gear 63, and the third power transmission shaft 59 rotate integrally with each other. Therefore, when the first hydraulic clutch 61 is disengaged while the second hydraulic clutch 62 is engaged, the second power transmission shaft 51, the carrier 66, the sun gear 63, and the third power transmission shaft 59 rotate integrally in the forward direction. The shift position of the shift position change mechanism 36 is thereby made "forward."

When the first hydraulic clutch 61 is engaged while the second hydraulic clutch 62 is disengaged, the shift position of the shift position change mechanism 36 is made "reverse." When the first hydraulic clutch 61 is engaged while the second hydraulic clutch 62 is disengaged, rotation of the ring gear 64 is restricted by the shift case 45. On the other hand, the sun gear 63 is rotatable relative to the carrier 66. Thus, as the second power transmission shaft 51 rotates in the forward direction, the planetary gears 65 revolve while rotating. As a result, the sun gear 63 and the third power transmission shaft 59 rotate in the reverse direction. The shift position of the shift position change mechanism 36 is thereby made "reverse."

When both the first hydraulic clutch 61 and the second hydraulic clutch 62 are disengaged, the shift position of the shift position change mechanism 36 is made "neutral." When the first hydraulic clutch 61 and the second hydraulic clutch 62 are both disengaged, the planetary gear mechanism 60 idles. Therefore, rotation of the second power transmission shaft 51 is not transmitted to the third power transmission shaft 59. The shift position of the shift position change mechanism 36 is thereby made "neutral."

Changing between the low speed gear ratio and the high speed gear ratio and the shift position change are performed as described above. Thus, as shown in FIG. 6, when the hydraulic clutch 53 for gear ratio change and the first hydraulic clutch 61 are disengaged while the second hydraulic clutch 62 is engaged, the shift position of the shift mechanism 34 is made "low speed forward."

When the hydraulic clutch 53 for gear ratio change and the second hydraulic clutch 62 are engaged while the first hydraulic clutch 61 is disengaged, the shift position of the shift mechanism 34 is made "high speed forward."

When the first hydraulic clutch 61 and the second hydraulic clutch 62 are both disengaged, the shift position of the shift mechanism 34 is made "neutral" regardless of the engaging state of the hydraulic clutch 53 for gear ratio change.

When the hydraulic clutch 53 for gear ratio change and the second hydraulic clutch 62 are disengaged while the first hydraulic clutch 61 is engaged, the shift position of the shift mechanism 34 is made "low speed reverse."

Further, when the hydraulic clutch 53 for gear ratio change and the first hydraulic clutch 61 are engaged while the second hydraulic clutch 62 is disengaged, the shift position of the shift mechanism 34 is made "high speed reverse."

Control Block of Boat 1

Now, description will be made of a control block of the boat 1 mainly with reference to FIG. 5.

First, description will be made of the control block of the outboard motor 20 with reference to FIG. 5. The outboard motor 20 is provided with the ECU 86. The ECU 86 constitutes a portion of the control device 91 shown in FIG. 2. The ECU 86 controls each of mechanisms of the outboard motor 20.

The ECU 86 includes a central processing unit (CPU) 86*a* as a computation section and a memory 86*b*. The memory 86*b* stores various settings such as maps to be discussed later. The memory 86*b* is connected to the CPU 86*a*. When the CPU 86*a* performs various calculations, it reads out necessary information stored in the memory 86*b*. As needed, the CPU 86*a* outputs computation results to the memory 86*b* and causes the memory 86*b* to store the computation results.

The throttle body 87 of the engine 30 is connected to the ECU 86. The throttle body 87 is controlled by the ECU 86. The throttle opening of the engine 30 is thus controlled. Specifically, the throttle opening of the engine 30 is controlled based on an operating amount of a control lever 83 and a sensitivity switching signal. As a result, the output of the engine 30 is controlled.

An engine speed sensor 88 is also connected to the ECU 86. The engine speed sensor 88 detects the rotational speed of the crankshaft 31 of the engine 30 shown in FIG. 1. The engine speed sensor 88 outputs the detected engine speed to the ECU 86.

The propulsion section 33 is provided with a propeller speed sensor 90. The propeller speed sensor 90 detects the rotational speed of the propeller 41. The propeller speed sensor 90 outputs the detected rotational speed to the ECU 86. The rotational speed of the propeller 41 is substantially the same as that of the propeller shaft 40. Thus, the propeller speed sensor 90 may detect the rotational speed of the propeller shaft 40.

The electromagnetic valve 72 for gear ratio change, the electromagnetic valve 74 for forward shift connection, and the electromagnetic valve 73 for reverse shift connection are connected to the ECU 86. The ECU 86 controls opening/closing and the opening degrees of the electromagnetic valve 72 for gear ratio change, the electromagnetic valve 74 for forward shift connection, and the electromagnetic valve 73 for reverse shift connection.

As shown in FIG. 5, the boat 1 includes a local area network (LAN) 80. The LAN 80 is extended over the hull 10. In the boat 1, signals are transmitted between devices via the LAN 80.

The ECU 86 of the outboard motor 20, a controller 82, and a display device 81 are connected to the LAN 80. The display device 81 displays information output from the ECU 86 and information output from the controller 82 to be discussed later. Specifically, the display device 81 displays a current speed, shift position, etc., of the boat 1.

The controller 82 includes the control lever 83, an accelerator opening sensor 84, a shift position sensor 85, and a mode selecting switch 92.

A shift position and an accelerator opening are input to the control lever 83 by operations of a boat operator of the boat 1. Specifically, when the boat operator operates the control lever 83, the accelerator opening sensor 84 and the shift position sensor 85 detect the accelerator opening and the shift position, respectively, corresponding to the position of the control lever 83. Each of the accelerator opening sensor 84 and the shift position sensor 85 is connected to the LAN 80. The accelerator opening sensor 84 and the shift position sensor 85 transmit an accelerator opening signal and a shift position signal, respectively, to the LAN 80. The ECU 86 receives, via the LAN 80, the accelerator opening signal and the shift position signal output from the accelerator opening sensor 84 and the shift position sensor 85.

Figure 8:
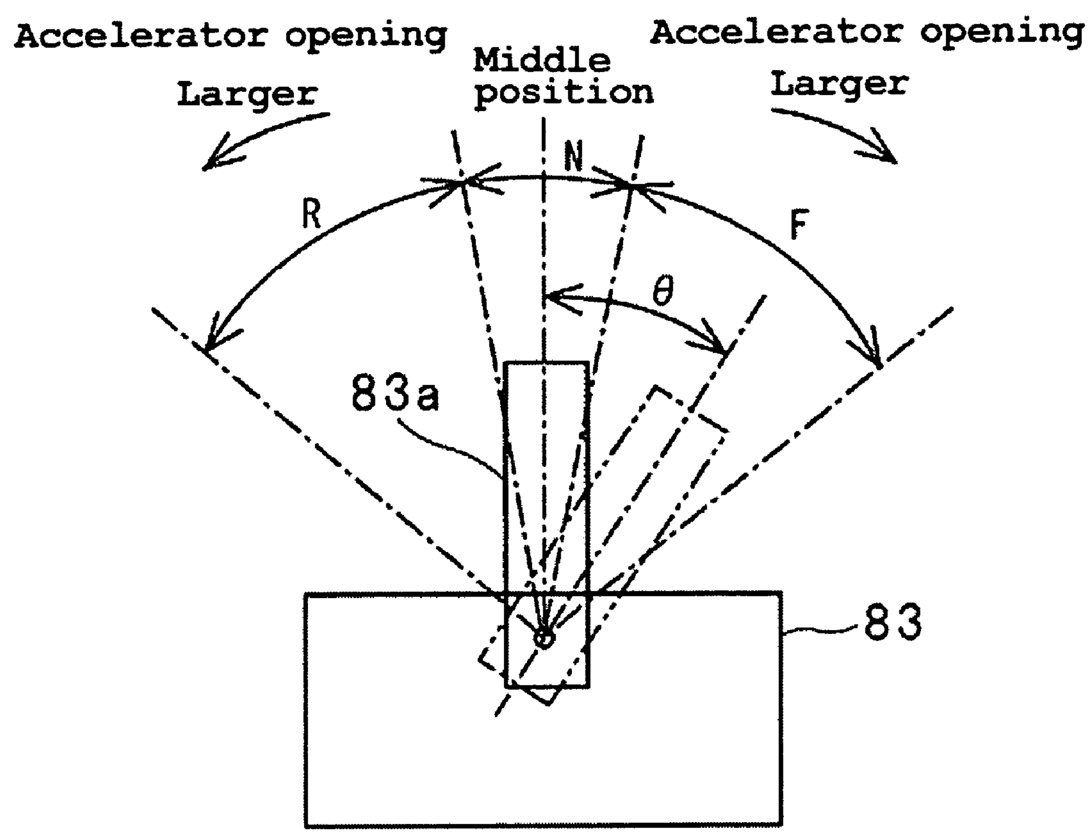
FIG. 8 is a conceptual illustration showing a control lever.

Specifically, when a control portion 83*a* of the control lever 83 is positioned in the neutral area indicated by "N" in FIG. 8, the shift position sensor 85 outputs a shift position signal corresponding to the neutral position. When the control portion 83*a* of the control lever 83 is positioned in the forward area indicated by "F" in FIG. 8, the shift position sensor 85 outputs a shift position signal corresponding to the forward position. When the control portion 83*a* of the control lever 83 is positioned in the reverse area indicated by "R" in FIG. 8, the shift position sensor 85 outputs a shift position signal corresponding to the reverse position.

The accelerator opening sensor 84 detects an operating amount of the control portion 83*a*. Specifically, the accelerator opening sensor 84 detects an operating angle θ that denotes how much the control portion 83*a* is operated from the middle position. The control portion 83*a* outputs the operating angle θ as an accelerator opening signal.

Either a first mode or a second mode is input to the mode selecting switch 92 shown in FIG. 5 by an operation of the boat operator. Here, the "first mode" is a mode in which the degree of the accelerator opening is relatively large with respect to the operating angle θ of the control lever 83 as shown as M1 in FIG. 9. In contrast, the "second mode" is a mode in which the degree of the accelerator opening is relatively small with respect to the operating angle θ of the control lever 83 as indicated by M2 in FIG. 9. That is, in the first mode and the second mode, the degree of the accelerator opening with respect to the operating angle θ of the control lever 83 is different.

The mode selecting switch 92 outputs to the ECU 86 a signal corresponding to an input mode of either one of the first mode or the second mode. In this preferred embodiment, this "signal corresponding to an input mode" is the sensitivity switching signal.

Figure 9:
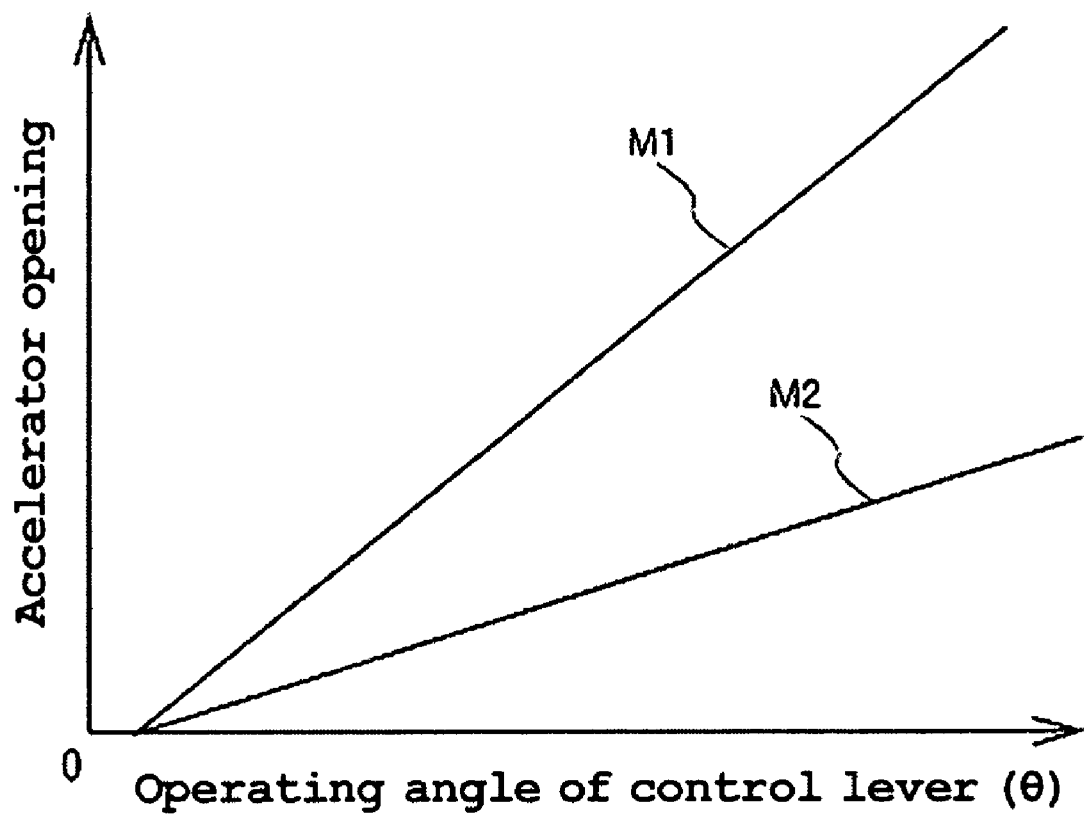
FIG. 9 is a graph showing the relationship between an operating angle of the control lever and an accelerator opening. In the figure, M1 represents the relationship between the operating angle of the control lever and the accelerator opening in a first mode. In the figure, M2 represents the relationship between the operating angle of the control lever and the accelerator opening in a second mode.

When the boat operator operates the mode selecting switch 92 to select the first mode, the CPU 86*a* refers to the map M1 shown in FIG. 9 that is stored in the memory 86*b* to determine the accelerator opening based on the input accelerator opening signal. In contrast, when the boat operator operates the mode selecting switch 92 to select the second mode, the CPU 86*a* refers to the map M2 shown in FIG. 9 that is stored in the memory 86*b* to determine the accelerator opening based on the input accelerator opening signal.

Control of Boat 1

Now, description will be made of the control of the boat 1.

Basic Control of Boat 1

When the control lever 83 is operated by the boat operator of the boat 1, the accelerator opening sensor 84 and the shift position sensor 85 detect the accelerator opening and the shift position corresponding to the operating state of the control lever 83. The detected accelerator opening and shift position are transmitted to the LAN 80. The ECU 86 receives an accelerator opening signal and a shift position signal output via the LAN 80. The ECU 86 controls the throttle body 87 and hydraulic clutches 61, 62 based on the accelerator opening obtained from the accelerator opening signal and the map shown in FIG. 9. The ECU 86 thus performs control of the rotational speed of the propeller.

The ECU 86 also controls the shift mechanism 34 according to the shift position signal. Specifically, in the case where a "low speed forward" shift position signal is received, the ECU 86 drives the electromagnetic valve 72 for gear ratio change to disengage the hydraulic clutch 53 for gear ratio change, and drives the electromagnetic valves 73, 74 for shift connection to disengage the first hydraulic clutch 61 and engage the second hydraulic clutch 62. The shift position is thus changed to the "low speed forward" position.

Specific Control of Boat 1

(1) Control of Rotational Speed of Propeller in First Mode and Second Mode

Figure 10:
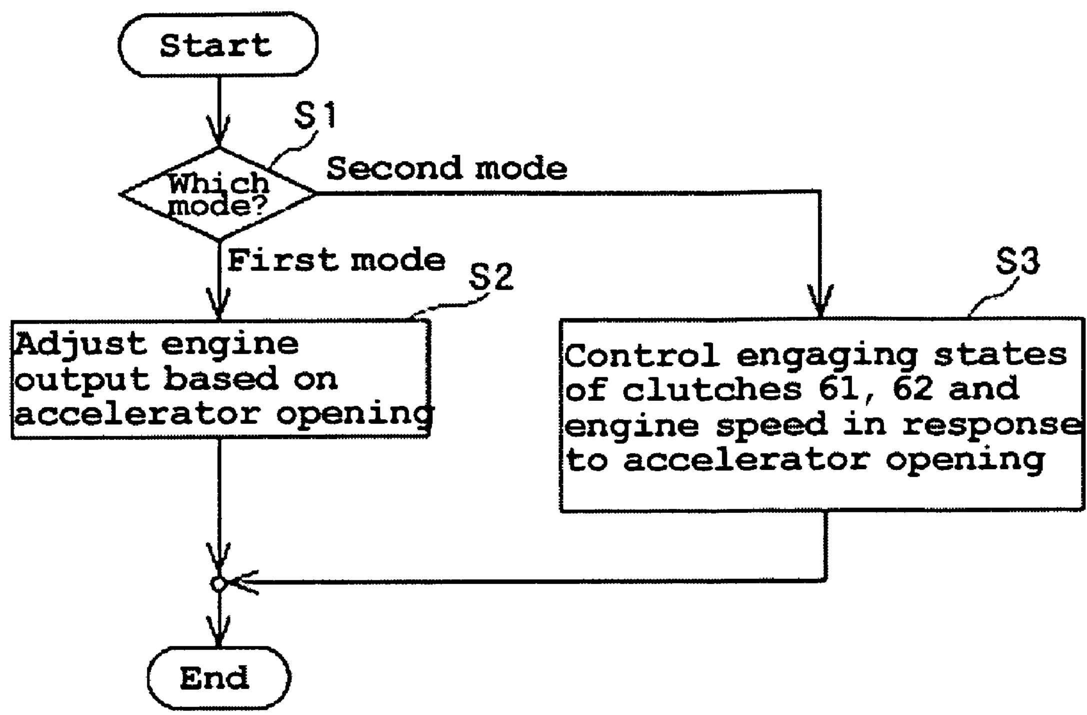
FIG. 10 is a flowchart showing control of the rotational speed of the propeller in the first and the second modes.

When the outboard motor 20 is operated, the control shown in FIG. 10 is repeated. As shown in FIG. 10, when the outboard motor 20 is operated, the mode is determined in step S1. If the mode is determined to be the first mode in step S1, the procedure proceeds to step S2. In step S2, the engine output is adjusted based on the accelerator opening without adjusting the connecting forces of the hydraulic clutches 61, 62 for shift change. The hydraulic clutches 61, 62 are adapted to be engaged or disengaged corresponding to the selected shift position. More specifically, the connecting forces of the hydraulic clutches 61, 62 preferably are substantially 0% or substantially 100%.

Accordingly, when either one of the hydraulic clutches 61, 62 is engaged, the rotational speed of the second power transmission shaft 51 as an input shaft is controlled to be substantially the same as dimensions of the rotational speed of the third power transmission shaft 59 as an output shaft. More specifically, the rotational speed of the second power transmission shaft 51 as an input shaft is controlled to be substantially the same as the rotational speed of the third power transmission shaft 59 as an output shaft. It should be noted that "substantially same rotational speed" means that the absolute value of the rotational speed is the same. In this regard, the rotational direction may be either same or reverse.

However, as described above, the reduction ratio of the planetary gear mechanism 60 may be other than 1:1. When the reduction ratio of the planetary gear mechanism 60 is not 1:1, the rotational speed of the second power transmission shaft 51 as an input shaft is not perfectly the same as the rotational speed of the third power transmission shaft 59 as an output shaft. In this preferred embodiment, "substantially same rotational speed" includes the case that has the difference of rotational speed of about 10%, for example.

On the other hand, if the mode is determined to be the second mode in step S1, the procedure proceeds to step S3. In step S3, the engine speed and the connecting forces of the hydraulic clutches 61, 62 are adjusted in response to the accelerator opening. Specific control of the rotational speed of the propeller in the second mode performed in step S3 will be described hereinafter with reference mainly to FIG. 11.

Figure 11:
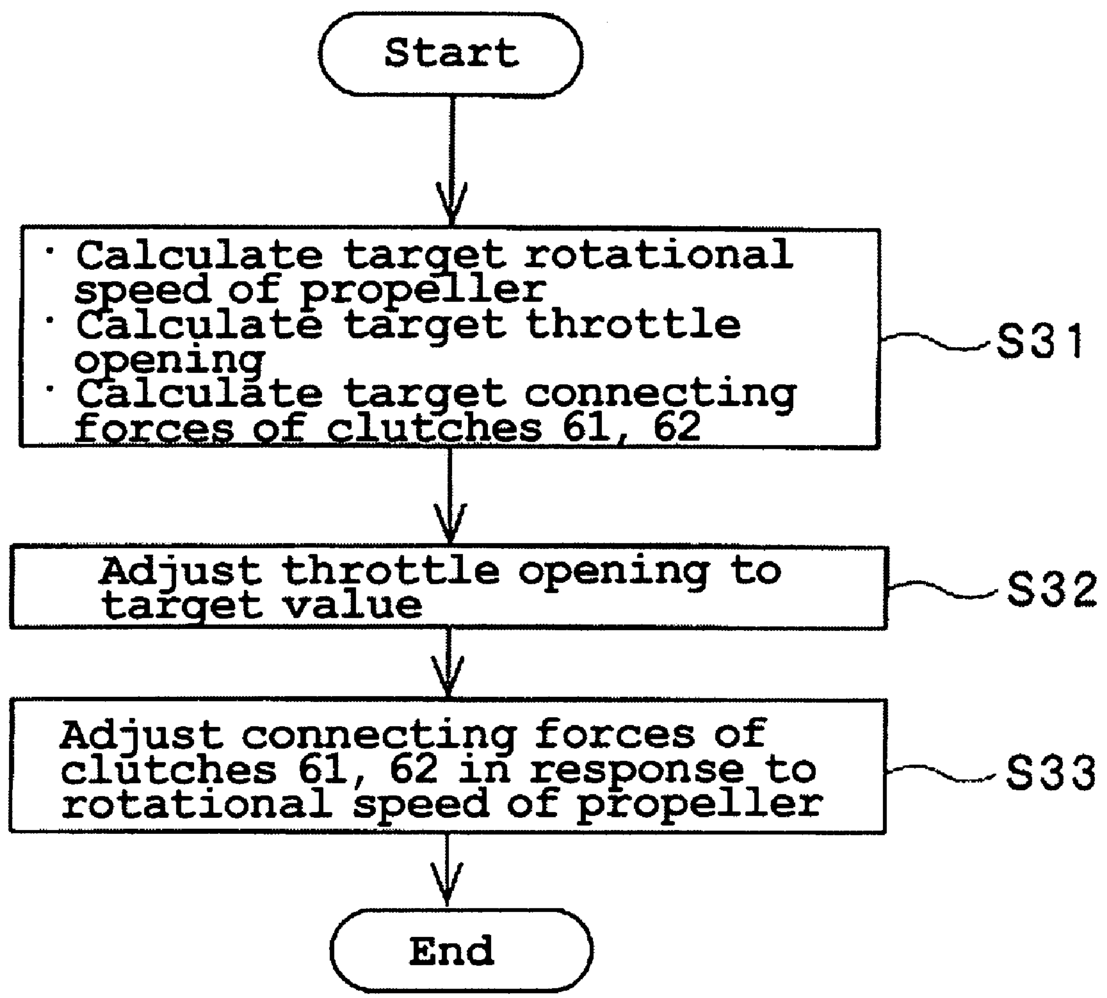
FIG. 11 is a flowchart showing control of the rotational speed of the propeller in the second mode.

As shown in FIG. 11, in the second mode, at first, a target rotational speed of the propeller, a target throttle opening, and target connecting forces of the hydraulic clutches 61, 62 are calculated in step S31.

Figure 12:
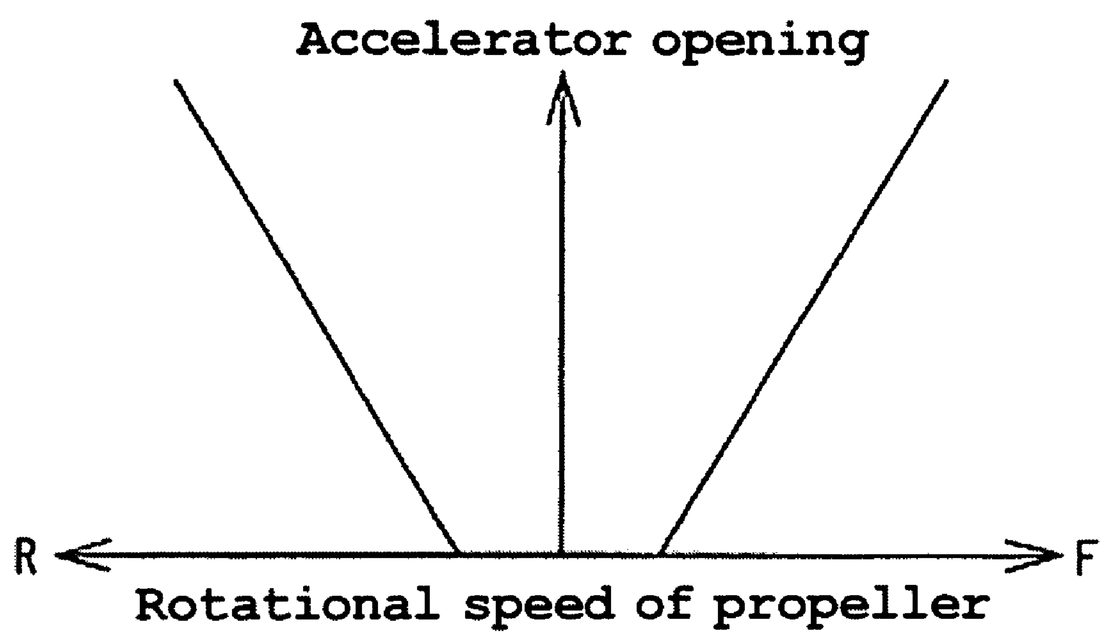
FIG. 12 is a map specifying the relationship between the accelerator opening and the rotational speed of the propeller.

Specifically, the CPU **86*a* reads out a map shown in FIG. 12 stored in the memory 86*b*. The map shown in FIG. 12 specifies the relationship between the rotational speed of the propeller and the accelerator opening. The CPU 86*a* applies the accelerator opening calculated from the accelerator opening signal to the map shown in FIG. 12 to calculate the target rotational speed of the propeller 41**.

Figure 13:
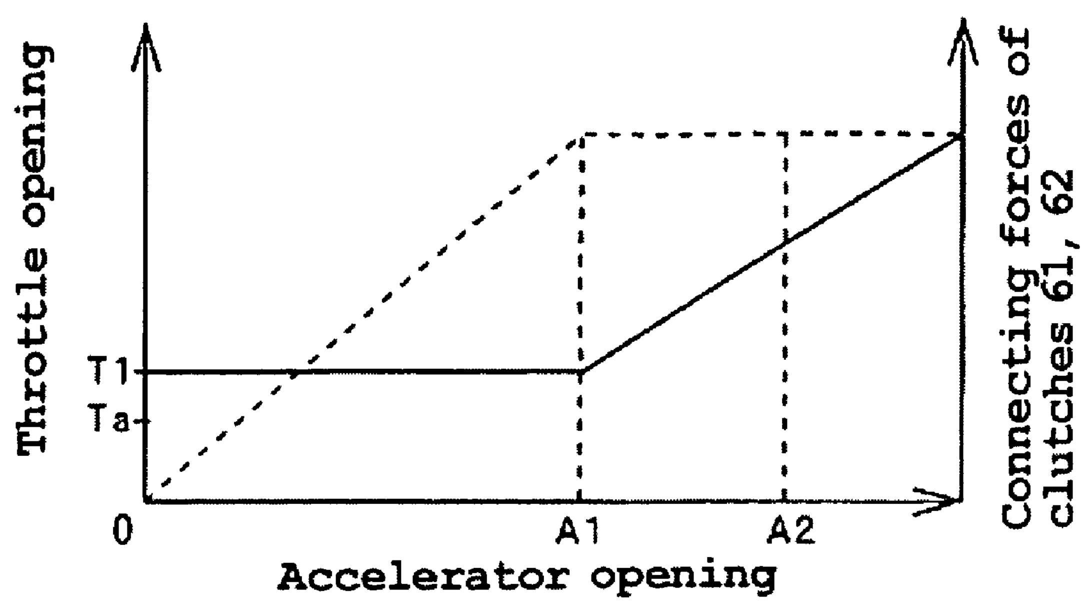
FIG. 13 is a map specifying the relationship between the accelerator opening, a throttle opening, and the connecting force of the hydraulic clutch for shift change. A graph in a bold line specifies the throttle opening. A graph in a broken line specifies the connecting force of the hydraulic clutch for shift change.

The CPU **86*a* reads out a map shown in FIG. 13 stored in the memory 86*b*. The map shown in FIG. 13 specifies the relationship between the accelerator opening, the throttle opening, and the target connecting forces of the hydraulic clutches 61, 62. Specifically, a graph indicated with a solid line in FIG. 13 specifies the throttle opening. A graph indicated with a broken line in FIG. 13 specifies the connecting forces of the hydraulic clutches 61, 62. The CPU 86*a* applies the calculated accelerator opening to the map shown in FIG. 13 to calculate the target throttle opening and the target connecting forces of the hydraulic clutches 61, 62**.

Here, as shown in FIG. 13, when the accelerator opening is equal to or smaller than a predetermined accelerator opening A1, the target throttle opening becomes T1 regardless of the accelerator opening. T1 is set slightly larger than a throttle opening Ta at an idling state of the engine 30. Therefore, when the accelerator opening is equal to or smaller than the predetermined accelerator opening A1, the engine speed is maintained generally constant.

In contrast, when the accelerator opening is larger than the predetermined accelerator opening A1, the target throttle opening increases as the accelerator opening increases. Thus, the engine speed is adjusted in response to the accelerator opening when the accelerator opening is larger than the predetermined accelerator opening A1.

Further, when the accelerator opening is equal to or smaller than the predetermined accelerator opening A1, the target connecting forces of the hydraulic clutches 61, 62 are set to increase as the accelerator opening increases. Also, when the accelerator opening is larger than the predetermined accelerator opening A1 and smaller than A2, the target connecting forces of the hydraulic clutches 61, 62 are set to increase as the accelerator opening increases. However, the rate of the target connecting forces of the hydraulic clutches 61, 62 relative to the accelerator opening at a time when the accelerator opening is larger than the predetermined accelerator opening A1 and smaller than A2 is set smaller than the rate of the target connecting forces of the hydraulic clutches 61, 62 relative to the accelerator opening at a time when the accelerator opening is equal to or smaller than the predetermined accelerator opening A1. When the accelerator opening is equal to or larger than the predetermined accelerator opening A2, the connecting forces of the hydraulic clutches 61, 62 become constant regardless of the accelerator opening.

Figure 14:
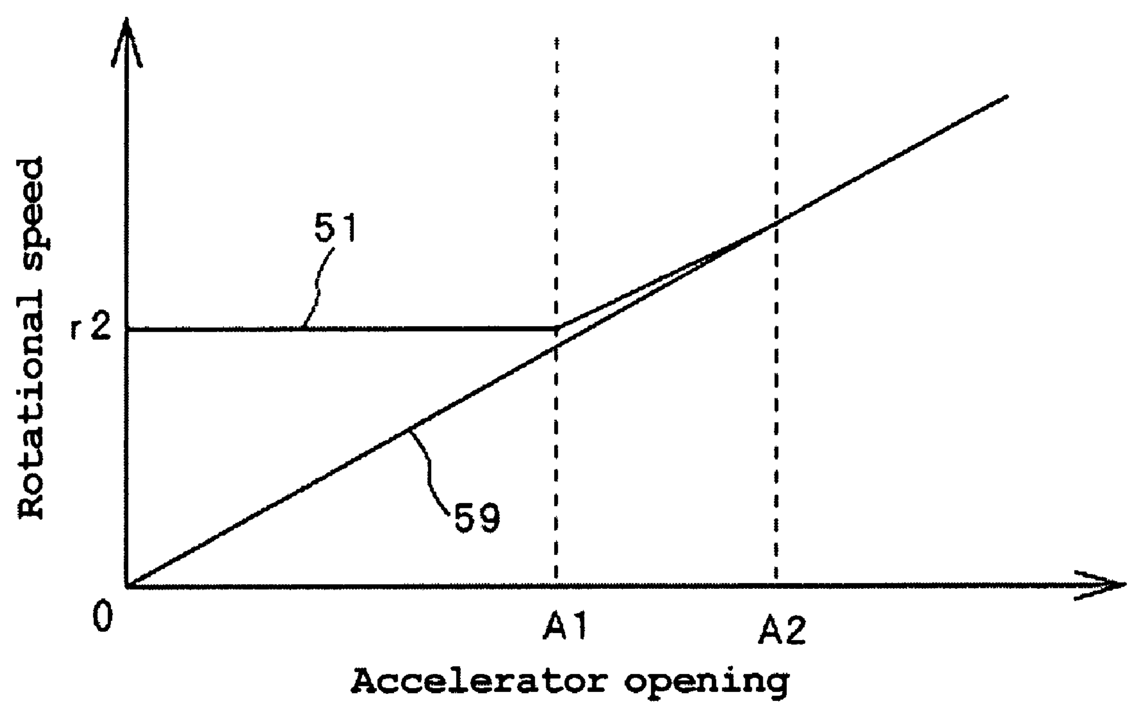
FIG. 14 is a graph showing the relationship between the rotational speeds of the second and the third power transmission shafts and the accelerator opening in the case where the throttle opening and the connecting force of the hydraulic clutch for shift change are respectively controlled to the target value.

Accordingly, when both of the throttle opening and the connecting forces of the hydraulic clutches 61, 62 are controlled according to the target, the relationship between the rotational speeds of the second power transmission shaft 51 and the third power transmission shaft 59 is as shown in FIG. 14.

Figure 15:
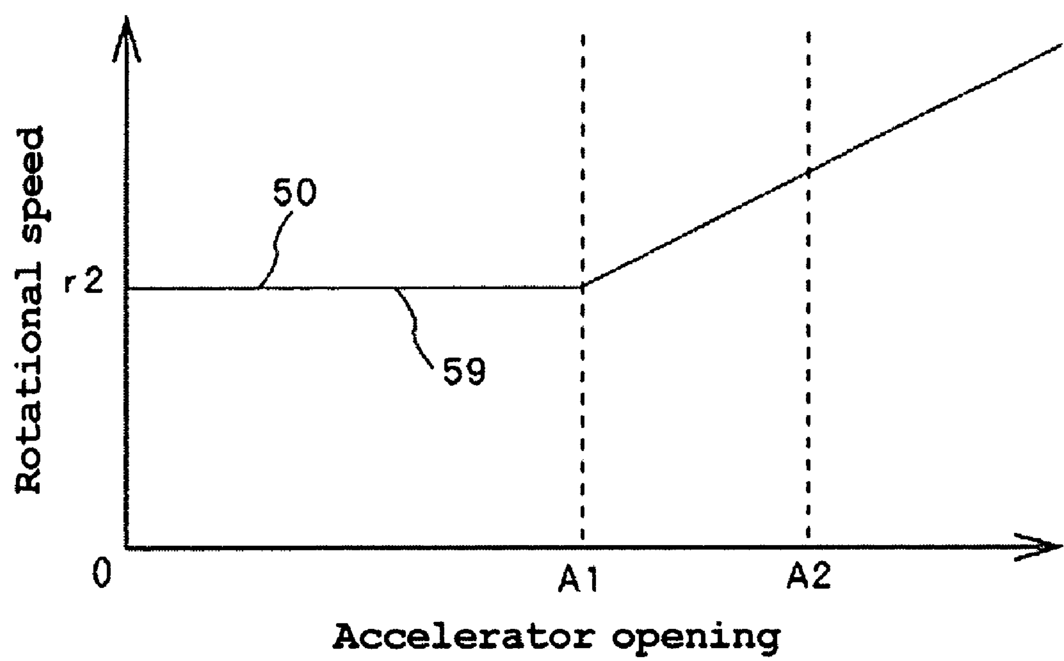
FIG. 15 is a graph showing the relationship between the accelerator opening and the rotational speeds of the second and the third power transmission shafts in the case where each of the hydraulic clutches for shift change is disengaged or engaged corresponding to the shift position.

In FIGS. 14 and 15, a line denoted by a numeral "51" shows the rotational speed of the second power transmission shaft 51. A line denoted by a numeral "59" shows the rotational speed of the third power transmission shaft 59.

For convenience of description, graphs shown in FIGS. 14 and 15 are a schematic graph assuming that loading conditions of the propeller 41 are constant. Since the loading conditions of the propeller 41 always vary, the actual relationship is not necessarily as shown in FIGS. 14 and 15. Additionally for convenience, the following description will also be made assuming that there is no load on the propeller 41.

Specifically, as shown in FIG. 14, when the accelerator opening is equal to or smaller than the predetermined accelerator opening A1, the rotational speed of the second power transmission shaft 51 is a predetermined rotational speed r2 and is generally constant. When the accelerator opening is larger than the predetermined accelerator opening A1, the rotational speed of the second power transmission shaft 51 increases as the accelerator opening increases.

On the other hand, when the accelerator opening is zero, the third power transmission shaft 59 does not substantially rotate. The rotational speed of the third power transmission shaft 59 increases as the accelerator opening increases from zero. When the accelerator opening is equal to the predetermined accelerator opening A1, the rotational speed of the second power transmission shaft 51 is approximately equal to the rotational speed of the third power transmission shaft 59. When the accelerator opening is equal to the predetermined accelerator opening A2, the rotational speed of the second power transmission shaft 51 is substantially equal to the rotational speed of the third power transmission shaft 59.

That is, when the accelerator opening is equal to the predetermined accelerator opening A2, the hydraulic clutches 61, 62 are substantially fully engaged. The hydraulic clutches 61, 62 are controlled in so-called half-clutch until the accelerator opening reaches the predetermined accelerator opening A2. The rotational speed of the third power transmission shaft 59 is thereby adjusted to be smaller than the rotational speed of the second power transmission shaft 51.

In this preferred embodiment, step S32 is performed following step S31 as shown in FIG. 11. In step S32, the throttle opening is adjusted to the calculated target throttle opening by the CPU 86*a*.

Next, in step S33, the connecting forces of the hydraulic clutches 61, 62 are adjusted by the CPU 86*a* in response to the actual rotational speed of the propeller detected by the propeller speed sensor 90. Specific adjustment control of the connecting forces of the hydraulic clutches 61, 62 performed in step S33 will be described hereinafter with reference mainly to FIG. 18.

Figure 18:
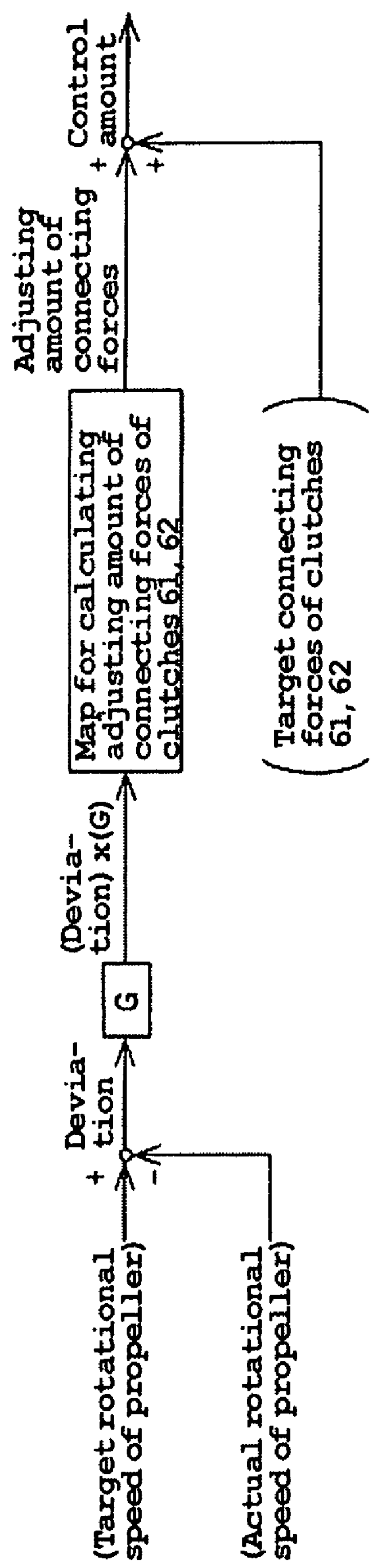
FIG. 18 is a control block diagram showing an example of adjustment control of the connecting force of the clutch performed in step S33.
Figure 19:
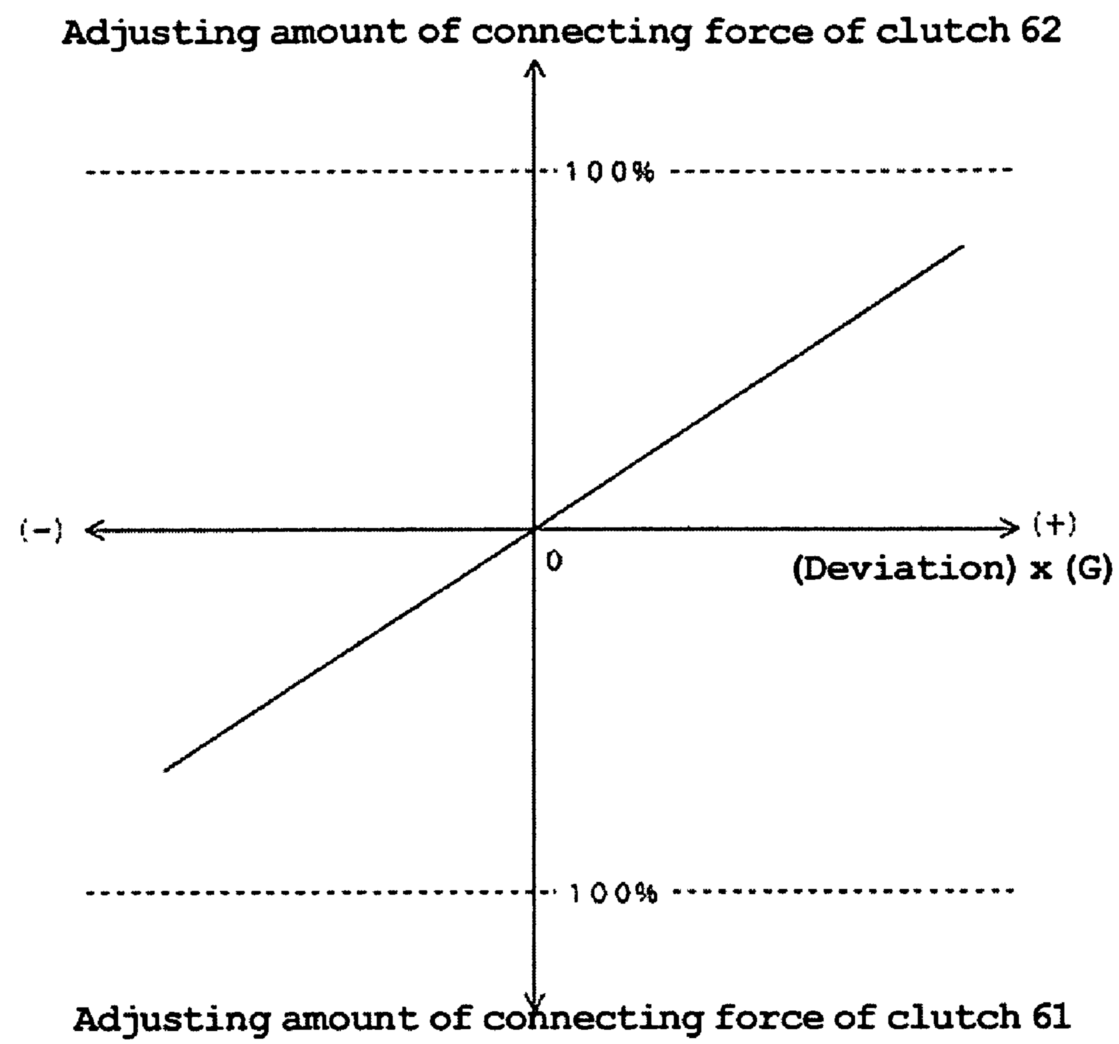
FIG. 19 is a map for calculating adjusting amounts of the connecting forces of the clutches.

As described above, in step S31, the CPU 86*a* calculates the target rotational speed of the propeller using the map in FIG. 12 showing the relationship between the accelerator opening and the rotational speed of the propeller. Next, as shown in FIG. 18, the CPU 86*a* calculates a deviation of the actual rotational speed of the propeller from the target rotational speed of the propeller. An adjusting amount to the target connecting forces of the hydraulic clutches 61, 62 is calculated based on the above deviation multiplied by the control gain. Specifically, the CPU 86*a* applies a value (deviation×gain(G)) to a map shown in FIG. 19 showing the relationship between the adjusting amount of the connecting forces of the hydraulic clutches 61, 62 and the value (deviation×gain(G)) to calculate the adjusting amount of the connecting forces of the hydraulic clutches 61, 62. The CPU 86*a* obtains the connecting forces of the hydraulic clutches 61, 62 by adding the calculated adjusting amount of the connecting forces of the hydraulic clutches 61, 62 to the calculated target connecting forces of the hydraulic clutches 61, 62. Thus, the CPU 86*a* adjusts the electromagnetic valves 73, 74 for shift connection based on the calculated connecting forces of the hydraulic clutches 61, 62 for shift change.

When the calculated connecting forces of the hydraulic clutches 61, 62 are in the range between 0 to 100%, the CPU 86*a* adjusts the electromagnetic valves 73, 74 so that the actual connecting forces of the hydraulic clutches 61, 62 are equal to the calculated connecting forces. When the calculated connecting forces of the hydraulic clutches 61, 62 are less than 0%, the CPU 86*a* adjusts the electromagnetic valves 73, 74 so that the connecting force of the opposite side clutch increases. Further, when the calculated connecting forces of the hydraulic clutches 61, 62 exceed 100%, the CPU 86*a* adjusts the electromagnetic valves 73, 74 so that either one of the connecting forces of the hydraulic clutches 61, 62 is equal to 100%.

In this case, the control gain is selected among the proportional gain, the integral gain, and the derivative gain in consideration of hydraulic responsiveness and mechanical inertia. Combination of two or more of the proportional gain, the integral gain, and the derivative gain may be used as the control gain.

Specific description will hereinafter be made referring to an example time chart shown in FIG. 20.

Figure 20:
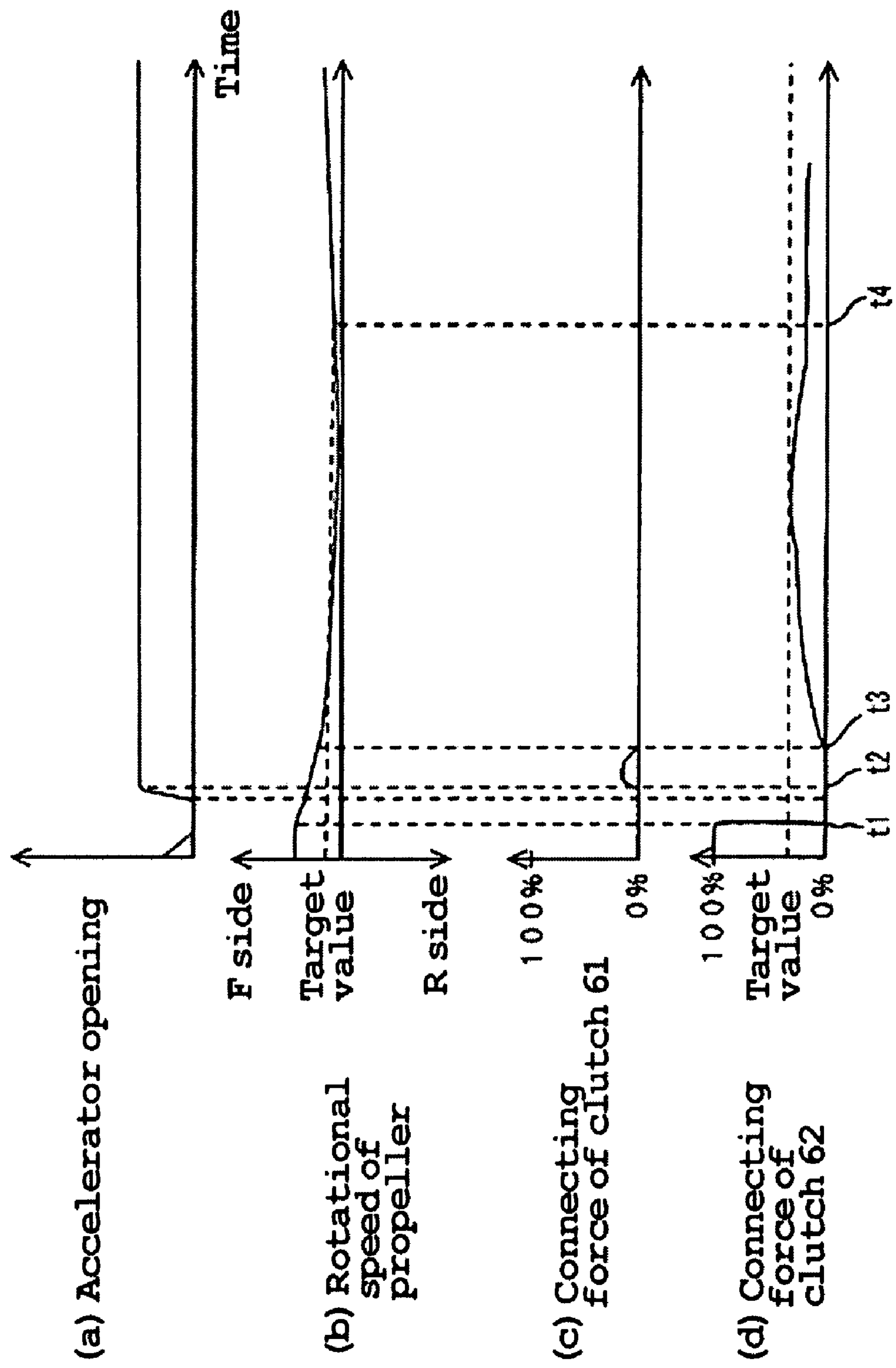
FIG. 20 is an example of a time chart showing the control performed in step S33.

In the example shown in FIG. 20, the shift position of the shift position change mechanism 36 is made neutral at time t1. Next, the second mode is started at time t2. Accordingly, engaging states of the hydraulic clutches 61, 62 and the engine speed are controlled in response to the accelerator opening after time t2 by step S3.

During a period between time t2 and time t3, the target rotational speed of the propeller approaches zero. During a period between time t2 and time t3, a deviation of the actual rotational speed of the propeller from the target rotational speed of the propeller is large. Accordingly, a control amount of the first hydraulic clutch 61 calculated by a computation shown in FIG. 18 becomes less than 0%. Therefore, the connecting force of the second hydraulic clutch 62 is increased despite the fact that the target rotational speed of the propeller is in the forward side. As a result, the rotational speed of the propeller decreases so that the actual rotational speed of the propeller approaches the target rotational speed of the propeller.

During a period between time t3 and time t4, a deviation of the actual rotational speed of the propeller from the target rotational speed of the propeller is small. Accordingly, a control amount of the first hydraulic clutch 61 calculated by a computation shown in FIG. 18 is in the range between 0 to 100%. Therefore, the connecting force of the second hydraulic clutch 62 is increased according to the calculated control amount.

After time t4, the feedback control shown in FIG. 18 becomes balanced. The connecting force of the first hydraulic clutch 61 is maintained slightly lower than the target connecting force after time t4.

In this preferred embodiment, the engaging states of the hydraulic clutches 61, 62 are controlled as described above in the second mode. The ratio of the rotational speed of the third power transmission shaft 59 to the rotational speed of the second power transmission shaft 51 can thereby be finely and accurately adjusted. This allows for more precise control of the rotational speed of the third power transmission shaft 59. Accordingly, it is easy to finely adjust the thrust and the propulsion speed. Especially, it is easy to finely adjust the thrust and the propulsion speed sailing in a low speed range or in a very low speed range during an operation of leaving from or approaching to a dock or quay, or during trolling.

Here, "low speed range" is, for example, a speed range about 10 km/h to about 20 km/h. "Very low speed range" is, for example, a speed range about 0 to about 10 km/h. However, these ranges are merely non-limiting examples. Definitions of the low speed range and the very low speed range are different depending on the types of boat in which a boat propulsion system is mounted.

In this preferred embodiment, as shown in FIG. 14, the engaging states of the hydraulic clutches 61, 62 can be controlled in a manner that the rotational speed of the third power transmission shaft 59 substantially varies continuously from zero to the rotational speed of the second power transmission shaft 51. Therefore, it is further easier to finely adjust the thrust and the propulsion speed.

For example, when the hydraulic clutches 61, 62 are controlled to be either disengaged or engaged corresponding to the shift position, and when the shift position is in a forward or a reverse position, the rotational speed of the second power transmission shaft 51 as an input shaft and the rotational speed of the third power transmission shaft 59 as an output shaft are controlled to be substantially the same as shown in FIG. 15. As shown in FIG. 15, this makes it difficult to adjust the rotational speed of the third power transmission shaft 59 to be lower than the rotational speed r2 of the second power transmission shaft 51 at idling of the engine 30. Therefore, it is difficult to adjust the rotational speed of the propeller to be lower than the predetermined rotational speed. As a result, it is difficult to generate little thrust.

In contrast, in this preferred embodiment, the hydraulic clutches 61, 62 are controlled by the ECU 86 to adjust the rotational speed of the third power transmission shaft 59 to be smaller than the rotational speed of the second power transmission shaft 51 in the second mode. Accordingly, as shown in FIG. 14, it is possible to adjust the rotational speed of the third power transmission shaft 59 to be lower than the rotational speed r2 of the second power transmission shaft 51 at idling of the engine 30. Therefore, it is possible to adjust the rotational speed of the propeller to be lower than the predetermined rotational speed. As a result, it is possible to generate further little thrust. This makes it easy to propel the boat 1 at low speed.

In this preferred embodiment, as described above, the engaging states of the hydraulic clutches 61, 62 can be controlled such that the rotational speed of the third power transmission shaft 59 substantially varies continuously from zero to the rotational speed of the second power transmission shaft 51. This makes it possible to generate very little thrust. Accordingly, it is also possible to propel the boat 1 at very low speed.

However, a method for controlling the engaging states of the hydraulic clutches 61, 62 is not specifically limited. For example, as with this preferred embodiment, the engaging states of the hydraulic clutches 61, 62 may be controlled by adjusting the connecting forces of the hydraulic clutches 61, 62. Also, the engaging states of the hydraulic clutches 61, 62 may be controlled by adjusting the connecting time of the hydraulic clutches 61, 62. Specifically, the engaging states of the hydraulic clutches 61, 62 may be controlled by changing ratios between the time of connecting and the time of disconnecting of the hydraulic clutches 61, 62. In other words, the engaging states of the hydraulic clutches 61, 62 may be controlled by adjusting the connecting time of the hydraulic clutches 61, 62 for each certain period.

When the connecting forces of the hydraulic clutches 61, 62 are adjusted, it is preferable to use a multi-plate type clutch for the hydraulic clutches 61, 62, as described in the present preferred embodiment. When a hydraulic clutch is used for clutches 61, 62, it is more preferable to use valves 72 to 74 that can gradually change hydraulic pressure. With the above configuration, it is easy to adjust the connecting forces of the hydraulic clutches 61, 62.

On the other hand, when the connecting time of the hydraulic clutches 61, 62 is adjusted, either a dog clutch or a multi-plate type clutch may be used as the hydraulic clutches 61, 62.

Second Preferred Embodiment

In the above first preferred embodiment, a case where both the engaging states of the hydraulic clutches 61, 62 and the engine speed are controlled in the second mode was described. However, only the engaging states of the hydraulic clutches 61, 62 may be controlled without controlling the engine speed in the second mode. In this preferred embodiment, a case where the engaging states of the hydraulic clutches 61, 62 are controlled without controlling the engine speed in the second mode will hereinafter be described.

In the following descriptions, components having substantially the same functions as those in the above first embodiment are designated by the same reference numerals, and their detailed description is omitted. In this preferred embodiment, FIGS. 1 to 9 will also be referred in common with the above first preferred embodiment.

Figure 16:
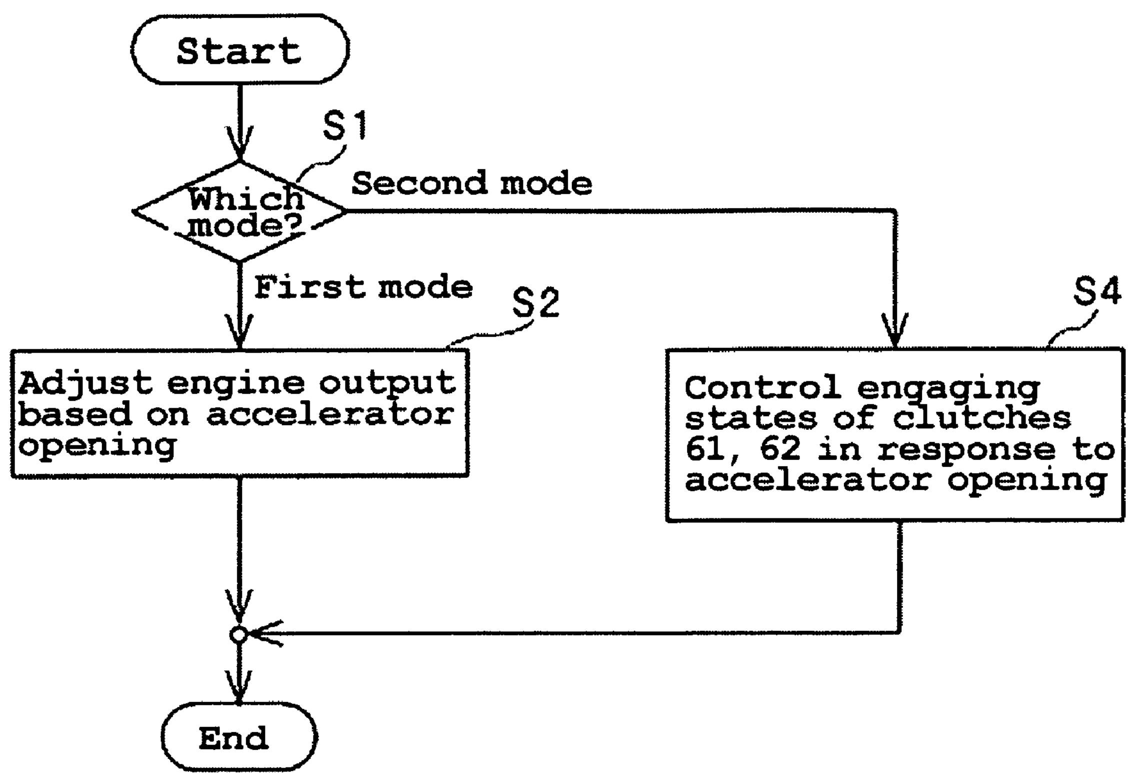
FIG. 16 is a flowchart showing control of the rotational speed of the propeller in the first and the second modes in a second preferred embodiment of the present invention.
Figure 17:
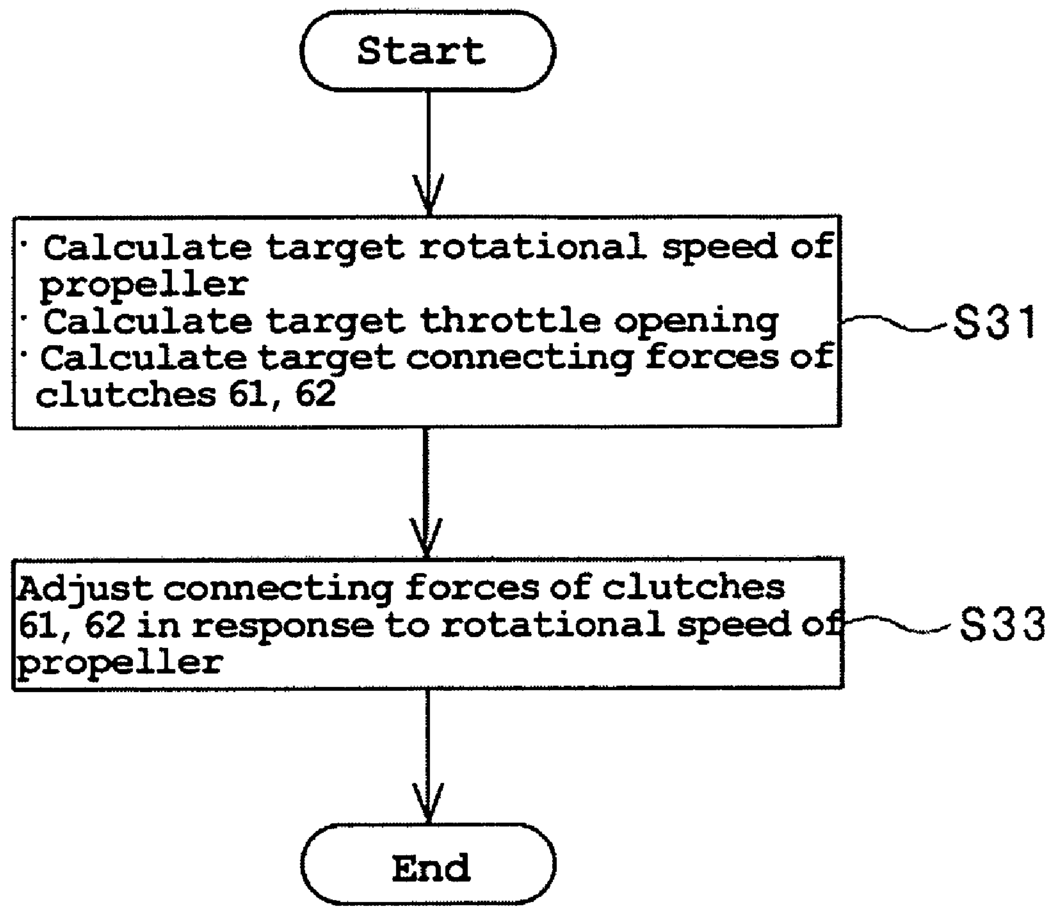
FIG. 17 is a flowchart showing control of the rotational speed of the propeller in the second mode in the second preferred embodiment of the present invention.

In this preferred embodiment, as shown in FIG. 16, if the mode is determined to be the second mode in step S1, the procedure proceeds to step S4. In step S4, the engaging states of the hydraulic clutches 61, 62 are controlled in response to the accelerator opening. Thus, as shown in FIG. 17, step S32 shown in FIG. 11 is not performed, but step S33 is performed following step S31.

In this case, it is also possible to finely adjust thrust of the boat 1 and to generate very little thrust.

Other Modifications

In the above preferred embodiments, examples have been provided with the mode selecting switch 92 for switching between the first mode and the second mode was described. However, the mode selecting switch 92 is not essential for the present invention.

For example, the mode may be controlled by the ECU 86 to be second mode automatically when the accelerator opening is equal to or smaller than a predetermined value and to be first mode automatically when the accelerator opening is larger than the predetermined value.

In the above preferred embodiments, an example in which two modes having different degrees of the accelerator opening relative to the operating angle θ of the control lever 83 are selectable was described. However, the number of the mode is not limited to two. For example, three or more modes having different degrees of the accelerator opening relative to the operating angle θ of the control lever 83 may be selectable. Specifically, for example, a very low speed mode, a low speed mode, and a normal mode may be selectable. The very low speed mode is used in sailing at very low speed during leaving from or approaching to the quay. In the very low speed mode, the degree of the accelerator opening relative to the operating angle θ of the control lever 83 is smallest. The low speed mode is used in sailing at low speed during trolling. In the low speed mode, the degree of the accelerator opening relative to the operating angle θ of the control lever 83 is relatively small. In the normal mode, the degree of the accelerator opening relative to the operating angle θ of the control lever 83 is set larger compared to the very low speed mode and the low speed mode.

In the above preferred embodiments, an example in which the shift position change mechanism 36 preferably includes one planetary gear mechanism 60 and two clutches 61, 62 has been described. In the present invention, however, the shift position change mechanism is not limited to this configuration. For example, the shift position change mechanism may include a forward/reverse change mechanism arranged in a coupling mechanism portion and a clutch for engaging or disengaging between the forward/reverse change mechanism and the engine 30.

In the above preferred embodiments, the memory **86*b* in the ECU 86 mounted on the outboard motor 20 preferably stores a map for controlling the gear ratio change mechanism 35 and a map for controlling the shift position change mechanism 36. In addition, the CPU 86*a* in the ECU 86 mounted on the outboard motor 20 outputs control signals for controlling the electromagnetic valves 72, 73, 74**.

However, the present invention is not limited to this configuration. For example, the controller 82 mounted on the hull 10 may be provided with a memory as a storage section and a CPU as a computation section, in addition to or in place of the memory **86*b* and the CPU 86*a*. In this case, the memory provided in the controller 82 may store a map for controlling the gear ratio change mechanism 35 and a map for controlling the shift position change mechanism 36. In addition, the CPU provided in the controller 82 may output control signals for controlling the electromagnetic valves 72, 73, 74**.

In the above preferred embodiments, an example in which the ECU 86 controls both the engine 30 and the electromagnetic valves 72, 73, 74 was described. However, the present invention is not limited hereto. For example, there may be separately provided an ECU for controlling the engine and an ECU for controlling the electromagnetic valves.

In the above preferred embodiments, the controller 82 is a so-called "electronic controller." Here, the term "electronic controller" refers to a controller that converts an operating amount of the control lever 83 into an electric signal and outputs the electric signal to the LAN 80.

In the present invention, however, the controller 82 may not necessarily be an electronic controller. For example, the controller 82 may be a so-called mechanical controller. Here, the term "mechanical controller" refers to a controller that includes a control lever and a wire connected to the control lever and that transmits the operating amount and direction of the control lever to the outboard motor as physical quantity of the operating amount and direction of the wire.

In the above preferred embodiments, an example in which the shift mechanism 34 has the gear ratio change mechanism 35 was described. However, the shift mechanism 34 may not have the gear ratio change mechanism 35. For example, the shift mechanism 34 may only have the shift position change mechanism 36.

In this specification, the connecting force of a clutch is a value representing an engaging state of the clutch. That is, "the connecting force of the hydraulic clutch 53 for gear ratio change is 100%," for example, means that the hydraulic piston 53*a* is driven to bring the plate group 53*b* into completely pressurized contact and that the hydraulic clutch 53 for gear ratio change is completely engaged. On the other hand, "the connecting force of the hydraulic clutch 53 for gear ratio change is 0%," for example, means that the hydraulic piston 53*a* is not driven to bring the plate group 53*b* into non-pressurized contact with each plate being separated and that the hydraulic clutch 53 for gear ratio change is completely disengaged. Further, "the connecting force of the hydraulic clutch 53 for gear ratio change is 80%," for example, means that the hydraulic clutch 53 for gear ratio change is driven to bring the plate group 53*b* into pressurized contact to establish a so-called half-clutch state in which the drive torque transmitted from the first power transmission shaft 50 as an input shaft to the second power transmission shaft 51 as an output shaft, or the rotational speed of the second power transmission shaft 51, is about 80% of the value when the gear hydraulic clutch 53 for ratio change is completely engaged.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A boat propulsion system comprising:

a power source to generate a turning force;

a propeller to be rotated by the turning force of the power source;

a shift position change mechanism including an input shaft to which the turning force of the power source is input, an output shaft to output the turning force to the propeller, and a clutch to engage or disengage the input shaft and the output shaft, and to change a shift position between a forward, a reverse, and a neutral position in which the clutch is disengaged; and a control device to control the shift position change mechanism; wherein the control device controls an engaging state of the clutch so that the rotational speed of the output shaft is substantially the same as the rotational speed of the input shaft in a first mode in which the shift position is the forward or the reverse, and the control device controls the engaging state of the clutch so that the rotational speed of the output shaft is lower than the rotational speed of the input shaft in a second mode in which the shift position is the forward or the reverse position.

2. The boat propulsion system according to claim 1, wherein the control device controls the engaging state of the clutch so that the rotational speed of the output shaft substantially varies continuously from zero to the rotational speed of the input shaft in the second mode.

3. The boat propulsion system according to claim 1, wherein the control device controls the engaging state of the clutch so that the rotational speed of the output shaft is lower than the rotational speed of the input shaft at a time of idling of the power source in the second mode.

4. The boat propulsion system according to claim 1, further comprising:

a control lever to which an accelerator opening is input by operation of an operator; and an accelerator opening detection section to detect a position of the control lever and to detect the accelerator opening corresponding to the position of the control lever to output to the control device; wherein the control device changes the engaging state of the clutch based on the accelerator opening while maintaining the rotational speed of the power source generally constant in the second mode.

5. The boat propulsion system according to claim 4, wherein the control device varies the rotational speed of the power source based on the accelerator opening while engaging the clutch to maintain the rotational speed of the output shaft substantially the same as the rotational speed of the input shaft in the first mode.

6. The boat propulsion system according to claim 1, wherein the control device controls the engaging state of the clutch to lower the rotational speed of the output shaft relative to the rotational speed of the input shaft in the second mode.

7. The boat propulsion system according to claim 1, wherein the control device controls a ratio of the time of engaging the clutch to the time of disengaging the clutch to lower the rotational speed of the output shaft relative to the rotational speed of the input shaft in the second mode.

8. The boat propulsion system according to claim 1, wherein the clutch is a multi-plate clutch.

9. The boat propulsion system according to claim 1, wherein the control device includes an actuator to adjust a connecting force of the clutch, and an electronic control unit to control the actuator.

10. The boat propulsion system according to claim 9, wherein the clutch includes:

an input shaft;

an output shaft;

a plate group including a first plate rotating with the input shaft and a second plate that opposes to the first plate, the plate group being displaceable in a first direction such that the first plate and the second plate come into pressurized contact with each other and in a second direction such that the first plate and the second plate are out of pressurized contact with each other, and the plate group rotates with the output shaft; and a hydraulic cylinder to cause the first plate and the second plate to come into and out of pressurized contact with each other; and the actuator includes:

a hydraulic pump to apply hydraulic pressure on the hydraulic cylinder;

an oil passage to connect the hydraulic pump and the hydraulic cylinder; and a valve to gradually change a cross-sectional area of the oil passage.

11. A boat propulsion system, comprising:

a power source to generate a turning force;

a propeller to be rotated by the turning force of the power source;

a shift position change mechanism including an input shaft to which the turning force of the power source is input, an output shaft to output the turning force to the propeller, and a clutch to change an engaging state between the input shaft and the output shaft, and to change a shift position between a forward position, a reverse position, and a neutral position in which the clutch is disengaged; and a control device to control the shift position change mechanism; wherein the control device controls an engaging state of the clutch so that the rotational speed of the output shaft is substantially the same as the rotational speed of the input shaft in a first mode in which the shift position is the forward or the reverse position and the control device controls the engaging state of the clutch so that the rotational speed of the output shaft is lower than the rotational speed of the input shaft in a second mode in which the shift position is the forward or the reverse position.

* * * * *